US012139198B2

(12) United States Patent
Sardes et al.

(10) Patent No.: US 12,139,198 B2
(45) Date of Patent: Nov. 12, 2024

(54) VEHICLE CHASSIS PLATFORM

(71) Applicant: REE AUTOMOTIVE LTD, Glil-Yam (IL)

(72) Inventors: Ahishay Sardes, Tel Aviv (IL); Eran Starik, Tel Aviv-Jaffa (IL); Ran Dekel, Nofit (IL); Tomer Segev, Tel-Aviv (IL); Amit Aknin, Karkom (IL); Eylon Avigur, Ramat-Gan (IL); Amos Boaz, Moshav Shoresh (IL)

(73) Assignee: REE AUTOMOTIVE LTD, Glil-Yam (IL)

( * ) Notice: Subject to any disclaimer, the term of this patent is extended or adjusted under 35 U.S.C. 154(b) by 0 days.

(21) Appl. No.: 18/012,497

(22) PCT Filed: Jul. 29, 2021

(86) PCT No.: PCT/IL2021/050924
§ 371 (c)(1),
(2) Date: Dec. 22, 2022

(87) PCT Pub. No.: WO2022/024134
PCT Pub. Date: Feb. 3, 2022

(65) Prior Publication Data

US 2023/0271648 A1    Aug. 31, 2023

Related U.S. Application Data

(63) Continuation of application No. 16/943,692, filed on Jul. 30, 2020, now Pat. No. 10,919,575.

(51) Int. Cl.
*B62D 21/03*    (2006.01)
*B60K 1/04*     (2019.01)
(Continued)

(52) U.S. Cl.
CPC ............... *B62D 21/03* (2013.01); *B60K 1/04* (2013.01); *B62D 25/08* (2013.01); *B62D 27/02* (2013.01); *B60K 2001/0405* (2013.01)

(58) Field of Classification Search
CPC ........ B62D 21/03; B62D 25/08; B62D 27/02; B62D 25/20; B62D 21/00; B62D 65/02;
(Continued)

(56) References Cited

U.S. PATENT DOCUMENTS 2,130,066 A  *  9/1938  Burgh ................... B62D 21/10
                                                     267/260
2,380,031 A  *  7/1945  Lindsay ............. B62D 25/2036
                                                  296/203.02
(Continued)

FOREIGN PATENT DOCUMENTS

CN       108556916       9/2018
CN       109955919       7/2019
(Continued)

OTHER PUBLICATIONS

Mercedes-Benz Vision Urbanetic, Aesthetics Meets Intelligence published by Auto&Design by Sep. 10, 2018 via Pietro Egidi, 6 10122 Turin, Italy downloaded from—https://autodesignmagazine.com/en/2018/09/mercedes-benz-vision-urbanetic/website on Jun. 16, 2021.
(Continued)

*Primary Examiner* — Paul N Dickson
*Assistant Examiner* — Shams Dhanani
(74) *Attorney, Agent, or Firm* — PEARL COHEN ZEDEK LATZER BARATZ LLP

(57) ABSTRACT

A vehicle chassis platform including: a frame having a front frame end, a rear frame end, a longitudinal frame axis, an upper frame surface, a bottom frame surface, a first longitudinal lateral frame surface and a second longitudinal
(Continued)

lateral frame surface, wherein the upper frame surface is substantially flat; and two or more mechanical connectors each on one of the first and second longitudinal lateral surfaces, each of mechanical connectors to couple a vehicle corner module (VCM) to the frame and to transfer mechanical loads between the frame and the VCM when the VCM is on the frame.

21 Claims, 17 Drawing Sheets

(51) Int. Cl.
  *B62D 25/08* (2006.01)
  *B62D 27/02* (2006.01)
(58) Field of Classification Search
  CPC .............. B60K 1/04; B60K 2001/0405; B60K 2001/0411; B60K 2001/0416; B60K 2001/0438; B60Y 2200/62
  See application file for complete search history.

(56) References Cited

U.S. PATENT DOCUMENTS

| | | | |
|---|---|---|---|
| 2,431,524 A * | 11/1947 | Lindsay | B62D 21/10 280/795 |
| 3,309,759 A * | 3/1967 | Vittone | B62D 21/183 29/401.1 |
| 3,419,303 A * | 12/1968 | Eggert, Jr. | B62D 21/10 296/204 |
| 3,613,307 A | 10/1971 | Baynes et al. | |
| D225,761 S | 1/1973 | Munn et al. | |
| 3,711,989 A | 1/1973 | Nielsen | |
| 4,415,051 A | 11/1983 | Taylor | |
| D282,677 S | 2/1986 | Arigaya | |
| D283,235 S | 4/1986 | Arigaya | |
| D283,236 S | 4/1986 | Arigaya | |
| D284,019 S | 5/1986 | Arigaya | |
| D285,950 S | 9/1986 | Arigaya | |
| 5,019,009 A | 5/1991 | Chao-Chin | |
| D317,336 S | 6/1991 | Tsuchiya | |
| 5,090,934 A | 2/1992 | Quercetti | |
| D332,978 S | 2/1993 | Tsuchiy | |
| D332,979 S | 2/1993 | Tsuchiya | |
| D365,572 S | 12/1995 | Cerny | |
| D403,023 S | 12/1998 | Araki | |
| 6,059,058 A | 5/2000 | Dower | |
| D451,050 S | 11/2001 | Cerny, Jr. | |
| D462,300 S | 9/2002 | Cerny, Jr. | |
| D464,913 S | 10/2002 | Cerny, Jr. | |
| 6,880,856 B2 | 4/2005 | Chernoff et al. | |
| D521,572 S | 5/2006 | Yuen | |
| D524,880 S | 7/2006 | Yuen | |
| 7,303,033 B2 * | 12/2007 | Chernoff | B60L 50/66 296/205 |
| 7,441,615 B2 * | 10/2008 | Borroni-Bird | B62D 21/10 180/402 |
| 7,520,355 B2 | 4/2009 | Chaney | |
| D593,616 S | 6/2009 | Asai | |
| 8,278,771 B2 | 10/2012 | Lai | |
| D775,032 S | 12/2016 | Palmer | |
| 9,783,233 B2 | 10/2017 | Brown | |
| D822,126 S | 7/2018 | Allmendinger | |
| D829,831 S | 10/2018 | Redlin | |
| 10,155,442 B2 | 12/2018 | Gong | |
| D844,070 S | 3/2019 | Christensen | |
| 10,266,206 B2 | 4/2019 | Gallier | |
| D851,183 S | 6/2019 | Wood | |
| 10,434,894 B2 | 10/2019 | Li | |
| 10,569,641 B1 | 2/2020 | Brewer | |
| D902,088 S | 11/2020 | Nakamura | |
| D902,792 S | 11/2020 | Farmer | |
| 10,919,575 B1 * | 2/2021 | Sardes | B62D 25/08 |
| D919,026 S | 5/2021 | Kumar | |
| 11,608,114 B2 * | 3/2023 | Sardes | B62D 65/04 |
| 2003/0038468 A1 | 2/2003 | Chernoff et al. | |
| 2003/0164255 A1 | 9/2003 | Borroni-Bird | |
| 2004/0069545 A1 | 4/2004 | Chernoff et al. | |
| 2004/0163859 A1 * | 8/2004 | Chernoff | B62D 21/07 180/65.1 |
| 2011/0095574 A1 | 4/2011 | Brown | |
| 2012/0121962 A1 | 5/2012 | Katayama | |
| 2012/0161472 A1 | 6/2012 | Rawlinson | |
| 2013/0153314 A1 | 6/2013 | Niedzwiecki | |
| 2014/0315064 A1 | 10/2014 | Katayama | |
| 2015/0083508 A1 * | 3/2015 | Bluethmann | B62D 5/0418 180/204 |
| 2017/0120951 A1 | 5/2017 | Ashraf | |
| 2017/0151870 A1 | 6/2017 | Gong | |
| 2018/0108891 A1 | 4/2018 | Fees | |
| 2018/0118265 A1 * | 5/2018 | Gallier | B62D 29/002 |
| 2018/0251102 A1 | 9/2018 | Han | |
| 2018/0261899 A1 | 9/2018 | Milton | |
| 2018/0345778 A1 | 12/2018 | Yamanaka | |
| 2019/0193620 A1 * | 6/2019 | Matsuoka | B60K 7/0007 |
| 2019/0210470 A1 | 7/2019 | Thomas | |
| 2019/0225093 A1 | 7/2019 | Li | |
| 2019/0255901 A1 | 8/2019 | Brandt | |
| 2020/0062097 A1 | 2/2020 | Hara | |
| 2020/0083573 A1 | 3/2020 | Caliskan | |
| 2022/0126918 A1 * | 4/2022 | Sardes | B62D 65/04 |
| 2022/0250458 A1 * | 8/2022 | Kimura | B62D 21/02 |
| 2022/0297742 A1 * | 9/2022 | Kwon | B62D 7/023 |
| 2023/0118900 A1 * | 4/2023 | Sardes | B62D 21/10 180/311 |
| 2023/0234438 A1 * | 7/2023 | Lee | B60G 3/20 180/6.48 |

FOREIGN PATENT DOCUMENTS

| | | | | |
|---|---|---|---|---|
| EP | 2390166 A1 * | 11/2011 | | B62D 21/04 |
| EP | 3 825 214 | 5/2021 | | |
| FR | 2945267 A3 * | 11/2010 | | B62D 21/02 |
| FR | 2977554 A1 * | 1/2013 | | B62D 21/10 |
| GB | 2565848 | 2/2019 | | |
| GB | 2580215 | 7/2020 | | |
| WO | WO 2012/117204 | 9/2012 | | |
| WO | WO 2017/213551 | 12/2017 | | |
| WO | WO2019038564 | 2/2019 | | |
| WO | WO-2019224111 A1 * | 11/2019 | | B60P 1/6427 |

OTHER PUBLICATIONS

Mercedes-Benz Vans Announces the Autonomous URBANETIC Flexible Mobility Concept by Kyle Field Published Sep. 11, 2018 Long Beach, California, United States downloaded from https://cleantechnica.com/2018/09/11/mercedes-benz-vans-announces-the-autonomous-urbanetic-flexible-mobility-concept/ on Jun. 16, 2021.
Machine translation (from Hebrew to English) of Hebrew language article: The Wheel (Electric Version) by Udi Etziyon—article from Calcalist May 10, 2019 downloaded from https://www.calcalist.co.il/local/articles/0,7340,L-3761852,00.html—article published on Nov. 1, 2019 [download of the article as translated (Machine translation) from Google translate both Nov. 1, 2021].
Office Action from Chinese Patent Application No. 202110401726.6 dated Apr. 28, 2023.
Chernoff, Adrian; The Skateboard Platform Impact—A 20 Year Journey; retrieved Aug. 3, 2020; http://www.adrianchernoff.com/project/electic-skateboard-platform/.
Mercedes-Benz Vision Urbanetic Concept Skateboard Chassis; Dec. 2018; retrieved Aug. 12, 2020; https://www.carbodydesign.com/gallery/2018/12/mercedes-benz-vision-urbanetic-concept/24/.
European Search Report for EP Patent Application No. 21849223.9 dated Sep. 6, 2024.

* cited by examiner

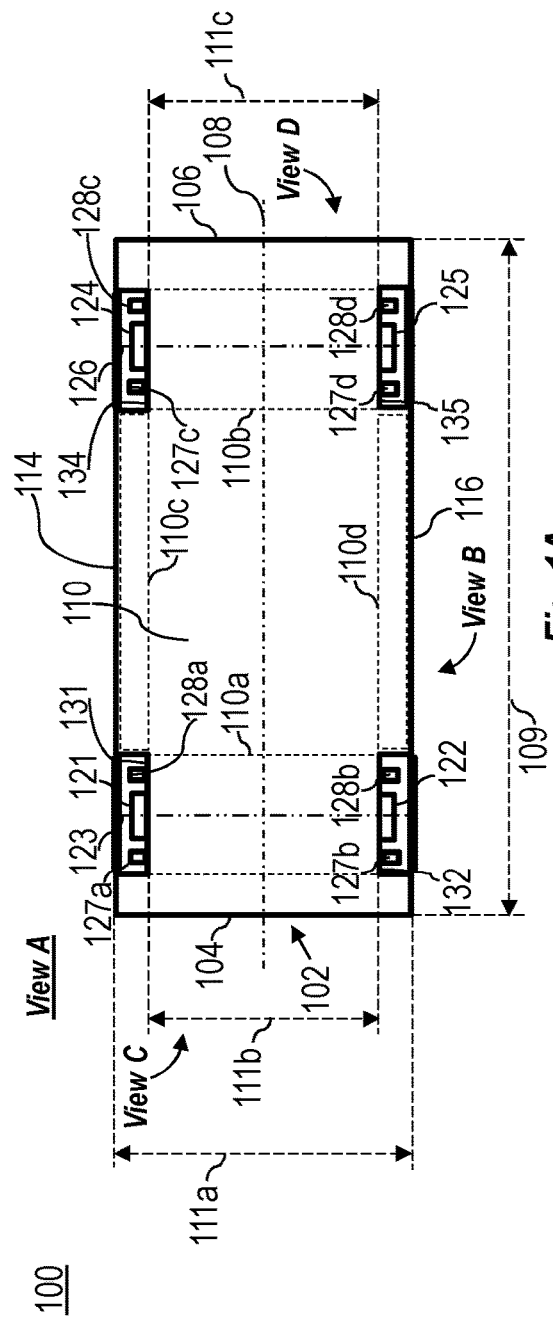
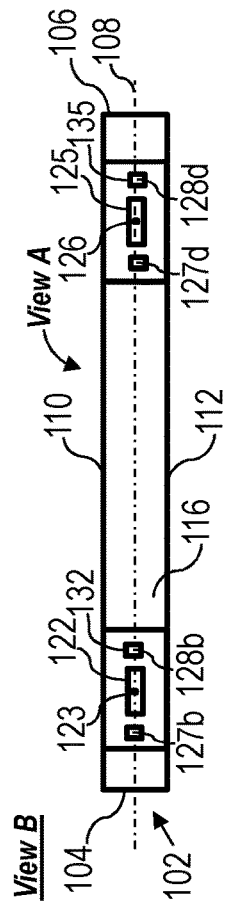
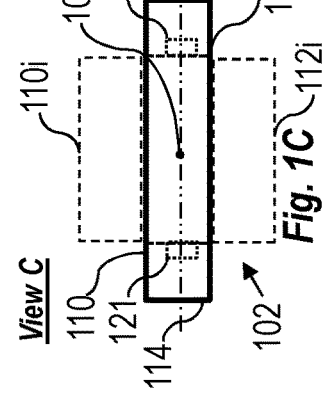

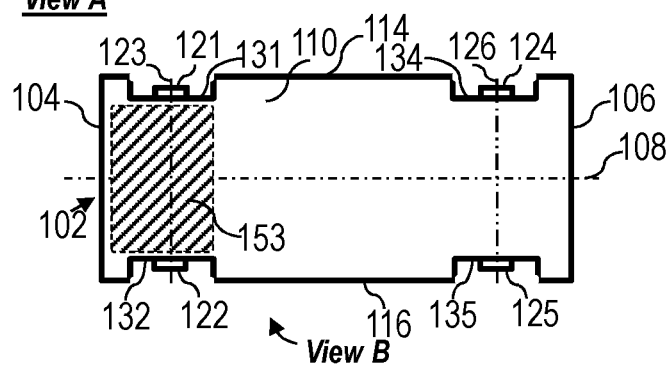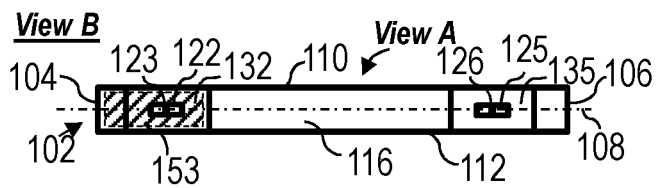
Fig. 1I
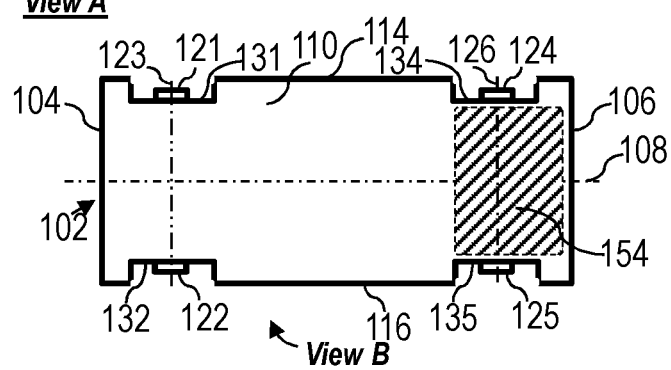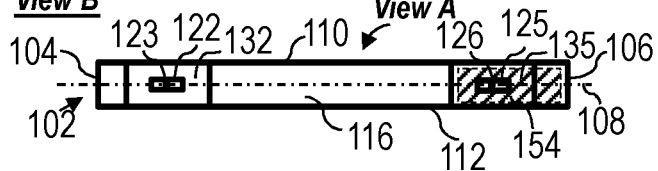
Fig. 1J

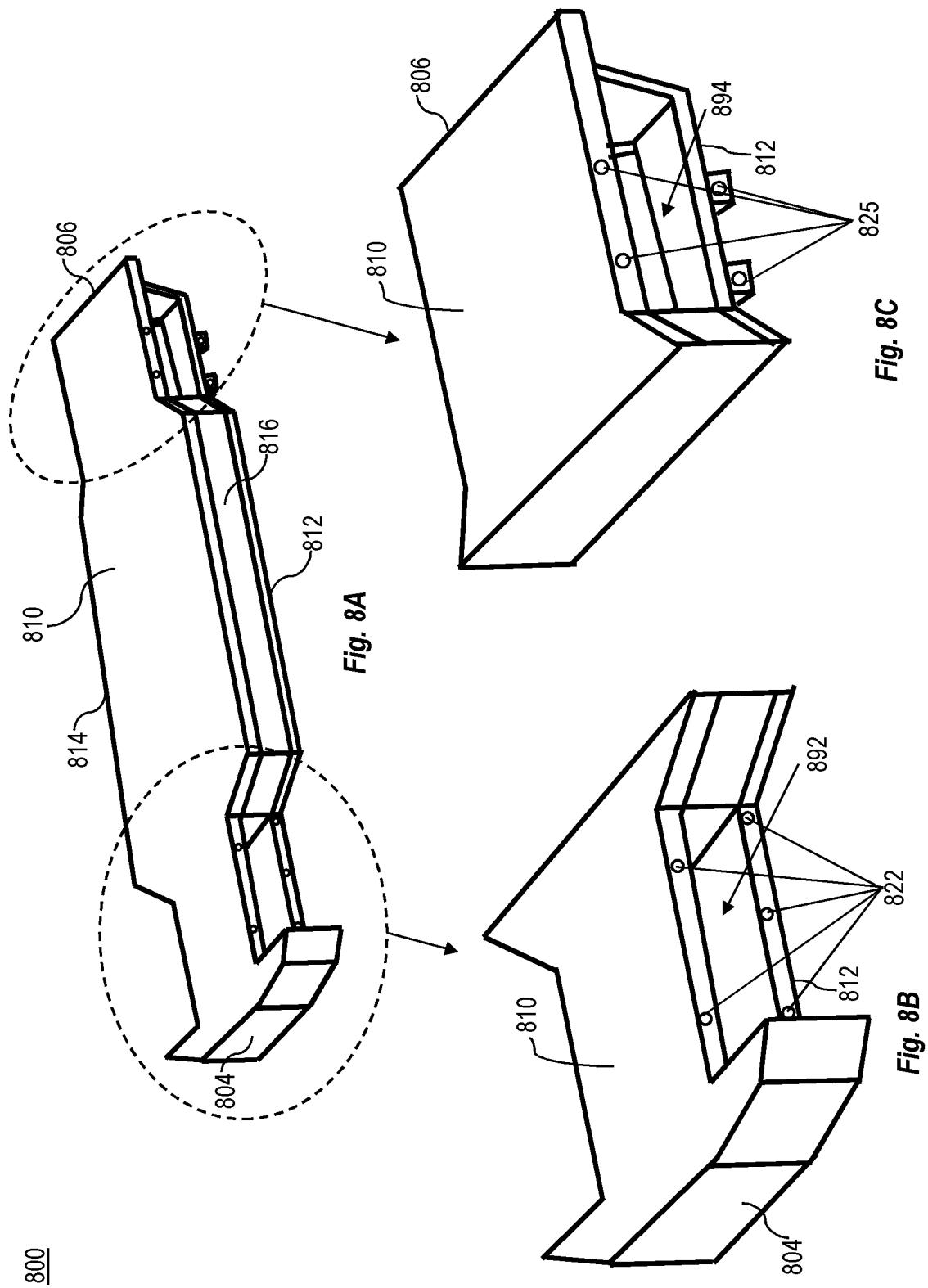

VEHICLE CHASSIS PLATFORM

CROSS-REFERENCE TO RELATED APPLICATIONS

This application is a National Phase Application of PCT International Application No. PCT/IL2021/050924, International Filing Date Jul. 29, 2021, which is a continuation of U.S. patent application Ser. No. 16/943,692, filed on Jul. 30, 2020, which are hereby incorporated by reference.

FIELD OF THE INVENTION

The present invention relates to the field of vehicle platforms, and more particularly, to vehicle chassis platforms.

BACKGROUND OF THE INVENTION

A vehicle chassis typically provides a load bearing framework for a motor vehicle or other wheeled conveyance. A vehicle chassis typically provides a framework for suspension, steering, drivetrain, and/or other systems of the vehicle. Components of these systems are typically positioned beneath a bottom surface of the vehicle chassis and can occupy a significant space beneath the bottom surface of the chassis and/or above the upper surface of the chassis. Such vehicle chassis typically has complex shape, relatively large footprint, and/or relatively high weight. Such vehicle chassis typically consists of non-continuous portions assembled to form the vehicle chassis. This may cause limited design flexibility of the vehicle chassis. For example, such vehicle chassis may have a limited number of locations that may accommodate electric-vehicle batteries (EVB) and/or limit the size of the EVB that may be used.

SUMMARY OF THE INVENTION

Some embodiments of the present invention may provide a vehicle chassis platform, including: a frame having a front frame end, a rear frame end, a longitudinal frame axis, an upper frame surface, a bottom frame surface, a first longitudinal lateral frame surface and a second longitudinal lateral frame surface, wherein the upper frame surface is substantially flat; and two or more mechanical connectors each on one of the first and second longitudinal lateral surfaces, each of mechanical connectors to couple a vehicle corner module (VCM) to the frame and to transfer mechanical loads between the frame and the VCM when the VCM is coupled to the frame.

In some embodiments, the bottom frame surface is substantially flat and substantially parallel to the upper frame surface.

In some embodiments, a width of the upper frame surface is between 60% and 100% of a length of the upper frame surface.

In some embodiments, the upper frame surface includes at least one non-flat upper frame surface portion and a flat upper frame surface portion, and wherein an area of the flat upper frame surface portion is between 80% and 95% of a total area of the upper frame surface.

In some embodiments, the upper frame surface includes two non-flat upper frame surface portions disposed adjacent to opposite longitudinal lateral frame surfaces with respect to each other and along a transverse frame axis that is perpendicular to the longitudinal frame axis, and a width of the flat upper frame surface in an intermediate region between the two non-flat upper frame surface portions is between 40% and 90% of a maximal width of the upper frame surface.

In some embodiments, the flat upper frame surface portion extends between at least one of: the front frame end and the rear frame end; and the first longitudinal lateral frame surface and the second longitudinal lateral frame surface.

In some embodiments, the vehicle chassis platform includes at least one of: a pair of front mechanical connectors including: a first front mechanical connector on the first longitudinal lateral frame surface, and a second front mechanical connector on the second longitudinal lateral frame surface, the first and second front mechanical connectors are positioned along a front transverse frame axis that is perpendicular to the longitudinal frame axis; and a pair of rear mechanical connectors including: a first rear mechanical connector on the first longitudinal lateral frame surface, and a second rear mechanical connector on the second longitudinal lateral frame surface, the first and second rear mechanical connectors are positioned along a rear transverse frame axis that is perpendicular to the longitudinal frame axis.

In some embodiments, the frame includes at least one of: a pair of front VCM indents including: a first front VCM indent being part of the first longitudinal lateral frame surface, the first front VCM indent includes the first front mechanical connector, and a second front VCM indent being part of the second longitudinal lateral frame surface, the second front VCM indent includes the second front mechanical connector; and a pair of rear VCM indents including: a first rear VCM indent being part of the first longitudinal lateral frame surface, the first rear VCM indent includes the first rear mechanical connector, and a second rear VCM indent being part of the second longitudinal lateral frame surface, the second rear VCM indent includes the second rear mechanical connector.

In some embodiments, a width of the upper frame surface in a region between at least one of: the first and second front VCM indents, and the first and second rear VCM indents, is between 40% and 90% of a maximal width of the upper frame surface.

In some embodiments, the frame includes one or more electrical-vehicle batteries compartments positioned between: the upper frame surface and the bottom frame surface, and between the front frame end and the front transverse frame axis.

In some embodiments, the frame includes one or more electrical-vehicle batteries compartments positioned between: the upper frame surface and the bottom frame surface, and between the rear frame end and the rear transverse frame axis.

In some embodiments, the frame includes one or more electrical-vehicle batteries compartments positioned between: the upper frame surface and the bottom frame surface, and between the first front mechanical connector and the second front mechanical connector.

In some embodiments, the frame includes one or more electrical-vehicle batteries compartments positioned between: the upper frame surface and the bottom frame surface, and between the first rear mechanical connector and the second rear mechanical connector.

In some embodiments, the vehicle chassis platform includes two or more suspension units each coupled to one of the first and second longitudinal lateral frame surfaces such that none of components of the respective suspension unit is positioned in an area beneath the bottom frame surface and in an area above the upper frame surface.

In some embodiments, the vehicle chassis platform includes two or more drivetrain units each coupled to one of the first and second longitudinal lateral frame surfaces such that none of components of the respective drivetrain unit is positioned in an area beneath the bottom frame surface and in an area above the upper frame surface.

In some embodiments, the vehicle chassis platform includes two or more steering units each coupled to one of the first and second longitudinal lateral frame surfaces such that none of components of the respective steering unit is positioned in an area beneath the bottom frame surface and in an area above the upper frame surface.

Some embodiments of the present invention may provide a vehicle including: a frame having a front frame end, a rear frame end, a longitudinal frame axis, an upper frame surface, a bottom frame surface, a first longitudinal lateral frame surface and a second longitudinal lateral frame surface, wherein the upper frame surface is substantially flat; and two or more mechanical connectors each on one of the first and second longitudinal lateral frame surfaces, each of mechanical connectors to couple a vehicle corner module (VCM) to the frame and to transfer mechanical loads between the frame and the VCM when the VCM is coupled to the frame.

In some embodiments, the upper frame surface includes at least one non-flat upper frame surface portion and a flat upper frame surface portion, and wherein an area of the flat upper frame surface portion is between 80% and 95% of a total area of the upper frame surface.

In some embodiments, the upper frame surface includes two non-flat upper frame surface portions disposed adjacent to opposite longitudinal lateral frame surfaces with respect to each other and along a transverse frame axis that is perpendicular to the longitudinal frame axis, and a width of the flat upper frame surface portion in an intermediate region between the two non-flat upper frame surface portions is between 40% and 90% of a maximal width of the upper frame surface.

In some embodiments, the flat upper frame surface portion extends between at least one of: the front frame end and the rear frame end; and the first longitudinal lateral frame surface and the second longitudinal lateral frame surface.

Some embodiments of the present invention may provide a vehicle chassis platform, including: a frame having a front frame end, a rear frame end, a longitudinal frame axis, an upper frame surface, a bottom frame surface, a first longitudinal lateral frame surface and a second longitudinal lateral frame surface, wherein the upper frame surface is substantially flat; and one or more pairs of opposing mechanical connectors, wherein each of the opposing mechanical connectors of each of the one or more pairs is on one of the first and second longitudinal lateral surfaces, and wherein each of the opposing mechanical connectors of each of the one or more pairs to couple a vehicle corner module (VCM) to the frame such that none of components of at least one of a suspension unit, a drivetrain unit, a brake unit, and a steering unit of the VCM is positioned in an area beneath the bottom frame surface and between the opposing mechanical connectors of the respective pair, and in an area above the upper frame surface and between the opposing mechanical connectors of the respective pair.

In some embodiments, each of the mechanical connectors of each of the one or more pairs to couple the VCM to the frame such that none of components of the suspension unit and the drivetrain unit of the VCM is positioned in an area beneath the bottom frame surface and between the opposing mechanical connectors of the respective pair, and in an area above the upper frame surface and between the opposing mechanical connectors of the respective pair.

In some embodiments, each of mechanical connectors of each of the one or more pairs to couple the VCM to the frame such that none of components of the suspension unit and the steering unit of the VCM is positioned in an area beneath the bottom frame surface and between the opposing mechanical connectors of the respective pair, and in an area above the upper frame surface and between the opposing mechanical connectors of the respective pair.

In some embodiments, each of mechanical connectors of each of the one or more pairs to couple the VCM to the frame such that none of components of the drivetrain unit and the steering unit of the VCM is positioned in an area beneath the bottom frame surface and between the opposing mechanical connectors of the respective pair, and in an area above the upper frame surface and between the opposing mechanical connectors of the respective pair.

In some embodiments, each of mechanical connectors of each of the one or more pairs to couple the VCM to the frame such that none of components of the drivetrain unit and the brake unit of the VCM is positioned in an area beneath the bottom frame surface and between the opposing mechanical connectors of the respective pair, and in an area above the upper frame surface and between the opposing mechanical connectors of the respective pair.

In some embodiments, each of mechanical connectors of each of the one or more pairs to couple the VCM to the frame such that none of components of the suspension unit and the brake unit of the VCM is positioned in an area beneath the bottom frame surface and between the opposing mechanical connectors of the respective pair, and in an area above the upper frame surface and between the opposing mechanical connectors of the respective pair.

In some embodiments, each of mechanical connectors of each of the one or more pairs to couple the VCM to the frame such that none of components of the steering unit and the brake unit of the VCM is positioned in an area beneath the bottom frame surface and between the opposing mechanical connectors of the respective pair, and in an area above the upper frame surface and between the opposing mechanical connectors of the respective pair.

In some embodiments, a minimal width of the upper frame surface is between 60% and 100% of a length of the upper frame surface.

In some embodiments, the upper frame surface includes at least one non-flat upper frame surface portion and a flat upper frame surface portion, and wherein an area of the flat upper frame surface portion is between 80% and 95% of a total area of the upper frame surface.

In some embodiments: the upper frame surface includes two non-flat upper frame surface portions disposed adjacent to opposite longitudinal lateral frame surfaces with respect to each other and along a transverse frame axis that is perpendicular to the longitudinal frame axis, and a width of the flat upper frame surface in an intermediate region between the two non-flat upper frame surface portions is between 40% and 90% of a maximal width of the upper frame surface.

In some embodiments, the flat upper frame surface portion extends between at least one of: the front frame end and the rear frame end; and the first longitudinal lateral frame surface and the second longitudinal lateral frame surface.

In some embodiments, the vehicle chassis platform further includes one or more electrical-vehicle batteries (EVB) compartments.

In some embodiments, at least a portion of at least one of the one or more EVB compartments is positioned between the upper frame surface and the bottom frame surface and between the opposing mechanical connectors of one of the one or more pairs of opposing mechanical connectors.

In some embodiments, the opposing mechanical connectors of each of the one or more pairs are positioned along a transverse axis that is perpendicular to the longitudinal frame axis, and at least a portion of at least one of the one or more EVB compartments is positioned between the front frame end and the transverse axis.

In some embodiments, the opposing mechanical connectors of each of the one or more pairs are positioned along a transverse axis that is perpendicular to the longitudinal frame axis, and at least a portion of at least one of the one or more EVB compartments is positioned between the rear frame end and the transverse axis.

In some embodiments, the vehicle chassis platform further includes at least one of: a pair of front mechanical connectors including: a first front mechanical connector on the first longitudinal lateral frame surface, and a second front mechanical connector on the second longitudinal lateral frame surface, the first and second front mechanical connectors are positioned along a front transverse frame axis that is perpendicular to the longitudinal frame axis; and a pair of rear mechanical connectors including: a first rear mechanical connector on the first longitudinal lateral frame surface, and a second rear mechanical connector on the second longitudinal lateral frame surface, the first and second rear mechanical connectors are positioned along a rear transverse frame axis that is perpendicular to the longitudinal frame axis.

In some embodiments, a minimal width of the upper frame surface in a region between at least one of: the first and second front mechanical connectors, and the first and second rear mechanical connectors, is between 40% and 90% of a maximal width of the upper frame surface.

In some embodiments, the vehicle chassis platform further includes one or more electrical-vehicle batteries compartments positioned between: the upper frame surface and the bottom frame surface, and between the front frame end and the front transverse frame axis.

In some embodiments, the vehicle chassis platform further includes one or more electrical-vehicle batteries compartments positioned between: the upper frame surface and the bottom frame surface, and between the rear frame end and the rear transverse frame axis.

In some embodiments, the vehicle chassis platform further includes one or more electrical-vehicle batteries compartments positioned between: the upper frame surface and the bottom frame surface, and between the first front mechanical connector and the second front mechanical connector.

In some embodiments, the vehicle chassis platform further includes one or more electrical-vehicle batteries compartments positioned between: the upper frame surface and the bottom frame surface, and between the first rear mechanical connector and the second rear mechanical connector.

In some embodiments, the frame includes at least one of: a pair of front VCM indents including: a first front VCM indent being part of the first longitudinal lateral frame surface, the first front VCM indent includes the first front mechanical connector, and a second front VCM indent being part of the second longitudinal lateral frame surface, the second front VCM indent includes the second front mechanical connector; and a pair of rear VCM indents including: a first rear VCM indent being part of the first longitudinal lateral frame surface, the first rear VCM indent includes the first rear mechanical connector, and a second rear VCM indent being part of the second longitudinal lateral frame surface, the second rear VCM indent includes the second front mechanical connector.

In some embodiments, a minimal width of the upper frame surface in a region between at least one of: the first and second front VCM indents, and the first and second rear VCM indents, is between 40% and 90% of a maximal width of the upper frame surface.

In some embodiments, the bottom frame surface is substantially flat and substantially parallel to the upper frame surface.

Some embodiments of the present invention provide a vehicle including the vehicle chassis platform described hereinabove.

Some embodiments of the present invention may provide a vehicle chassis platform, including: a frame having a front frame end, a rear frame end, a longitudinal frame axis, an upper frame surface, a bottom frame surface, a first longitudinal lateral frame surface and a second longitudinal lateral frame surface, wherein the upper frame surface is substantially flat; one or more pairs of opposing mechanical connectors, each of the opposing mechanical connectors of each of the one or more pairs is on one of the first and second longitudinal lateral surfaces and configured to couple a vehicle corner module (VCM) to the frame; and one or more electrical-vehicle batteries (EVB) compartments, wherein at least a portion of at least one of the one or more EVB compartments is positioned between the upper frame surface and the bottom frame surface and between the opposing mechanical connectors of one of the one or more pairs of opposing mechanical connectors.

In some embodiments, the opposing mechanical connectors of each of the one or more pairs are positioned along a transverse axis that is perpendicular to the longitudinal frame axis, and at least a portion of at least one of the one or more EVB compartments is positioned between the front frame end and the transverse axis.

In some embodiments, the opposing mechanical connectors of each of the one or more pairs are positioned along a transverse axis that is perpendicular to the longitudinal frame axis, and at least a portion of at least one of the one or more EVB compartments is positioned between the rear frame end and the transverse axis.

In some embodiments, a minimal width of the upper frame surface is between 60% and 100% of a length of the upper frame surface.

In some embodiments, the upper frame surface includes at least one non-flat upper frame surface portion and a flat upper frame surface portion, and wherein an area of the flat upper frame surface portion is between 80% and 95% of a total area of the upper frame surface.

In some embodiments: the upper frame surface includes two non-flat upper frame surface portions disposed adjacent to opposite longitudinal lateral frame surfaces with respect to each other and along a transverse frame axis that is perpendicular to the longitudinal frame axis, and a width of the flat upper frame surface in an intermediate region between the two non-flat upper frame surface portions is between 40% and 90% of a maximal width of the upper frame surface.

In some embodiments, the flat upper frame surface portion extends between at least one of: the front frame end and the rear frame end; and the first longitudinal lateral frame surface and the second longitudinal lateral frame surface.

In some embodiments, the vehicle chassis platform further includes at least one of: a pair of front mechanical connectors including: a first front mechanical connector on the first longitudinal lateral frame surface, and a second front mechanical connector on the second longitudinal lateral frame surface, the first and second front mechanical connectors are positioned along a front transverse frame axis that is perpendicular to the longitudinal frame axis; and a pair of rear mechanical connectors including: a first rear mechanical connector on the first longitudinal lateral frame surface, and a second rear mechanical connector on the second longitudinal lateral frame surface, the first and second rear mechanical connectors are positioned along a rear transverse frame axis that is perpendicular to the longitudinal frame axis.

In some embodiments, a minimal width of the upper frame surface in a region between at least one of: the first and second front mechanical connectors, and the first and second rear mechanical connectors, is between 40% and 90% of a maximal width of the upper frame surface.

In some embodiments, at least one of the one or more EVB compartments positioned between: the upper frame surface and the bottom frame surface, and between the front frame end and the front transverse frame axis.

In some embodiments, at least one of the one or more EVB compartments positioned between: the upper frame surface and the bottom frame surface, and between the rear frame end and the rear transverse frame axis.

In some embodiments, at least one of the one or more EVB compartments positioned between: the upper frame surface and the bottom frame surface, and between the first front mechanical connector and the second front mechanical connector.

In some embodiments, at least one of the one or more EVB compartments positioned between: the upper frame surface and the bottom frame surface, and between the first rear mechanical connector and the second rear mechanical connector.

In some embodiments, the frame includes at least one of: a pair of front VCM indents including: a first front VCM indent being part of the first longitudinal lateral frame surface, the first front VCM indent includes the first front mechanical connector, and a second front VCM indent being part of the second longitudinal lateral frame surface, the second front VCM indent includes the second front mechanical connector; and a pair of rear VCM indents including: a first rear VCM indent being part of the first longitudinal lateral frame surface, the first rear VCM indent includes the first rear mechanical connector, and a second rear VCM indent being part of the second longitudinal lateral frame surface, the second rear VCM indent includes the second front mechanical connector.

In some embodiments, a minimal width of the upper frame surface in a region between at least one of: the first and second front VCM indents, and the first and second rear VCM indents, is between 40% and 90% of a maximal width of the upper frame surface.

In some embodiments, the bottom frame surface is substantially flat and substantially parallel to the upper frame surface.

In some embodiments, each of the opposing mechanical connectors of each of the one or more pairs to couple the VCM to the frame such that none of components of at least one of a suspension unit, a drivetrain unit and a steering unit of the VCM is positioned in an area beneath the bottom frame surface and between the opposing mechanical connectors of the respective pair, and in an area above the upper frame surface and between the opposing mechanical connectors of the respective pair.

In some embodiments, each of the mechanical connectors of each of the one or more pairs to couple the VCM to the frame such that none of components of the suspension unit and the drivetrain unit of the VCM is positioned in an area beneath the bottom frame surface and between the opposing mechanical connectors of the respective pair, and in an area above the upper frame surface and between the opposing mechanical connectors of the respective pair.

In some embodiments, each of mechanical connectors of each of the one or more pairs to couple the VCM to the frame such that none of components of the suspension unit and the steering unit of the VCM is positioned in an area beneath the bottom frame surface and between the opposing mechanical connectors of the respective pair, and in an area above the upper frame surface and between the opposing mechanical connectors of the respective pair.

In some embodiments, each of mechanical connectors of each of the one or more pairs to couple the VCM to the frame such that none of components of the drivetrain unit and the steering unit of the VCM is positioned in an area beneath the bottom frame surface and between the opposing mechanical connectors of the respective pair, and in an area above the upper frame surface and between the opposing mechanical connectors of the respective pair.

In some embodiments, each of mechanical connectors of each of the one or more pairs to couple the VCM to the frame such that none of components of the drivetrain unit and the brake unit of the VCM is positioned in an area beneath the bottom frame surface and between the opposing mechanical connectors of the respective pair, and in an area above the upper frame surface and between the opposing mechanical connectors of the respective pair.

In some embodiments, each of mechanical connectors of each of the one or more pairs to couple the VCM to the frame such that none of components of the suspension unit and the brake unit of the VCM is positioned in an area beneath the bottom frame surface and between the opposing mechanical connectors of the respective pair, and in an area above the upper frame surface and between the opposing mechanical connectors of the respective pair.

In some embodiments, each of mechanical connectors of each of the one or more pairs to couple the VCM to the frame such that none of components of the steering unit and the brake unit of the VCM is positioned in an area beneath the bottom frame surface and between the opposing mechanical connectors of the respective pair, and in an area above the upper frame surface and between the opposing mechanical connectors of the respective pair.

Some embodiments of the present invention provide a vehicle including the vehicle chassis platform described hereinabove.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings:

FIGS. 1A, 1B, 1C and 1D are schematic illustrations of a vehicle chassis platform, according to some embodiments of the invention;

FIGS. 1G, 1H, 1I, 1J, 1K and 1L are schematic illustrations of a vehicle chassis platform including one or more electrical-vehicle batteries (EVB) compartments, according to some embodiments of the invention;

FIG. 8A is a schematic illustration of an embodiment of a vehicle chassis platform, according to some embodiments of the invention and FIGS. 8B and 8C are schematic illustration of a front portion and a rear portion, respectively, of the vehicle chassis platform, according to some embodiments of the invention.

Figure 1E:
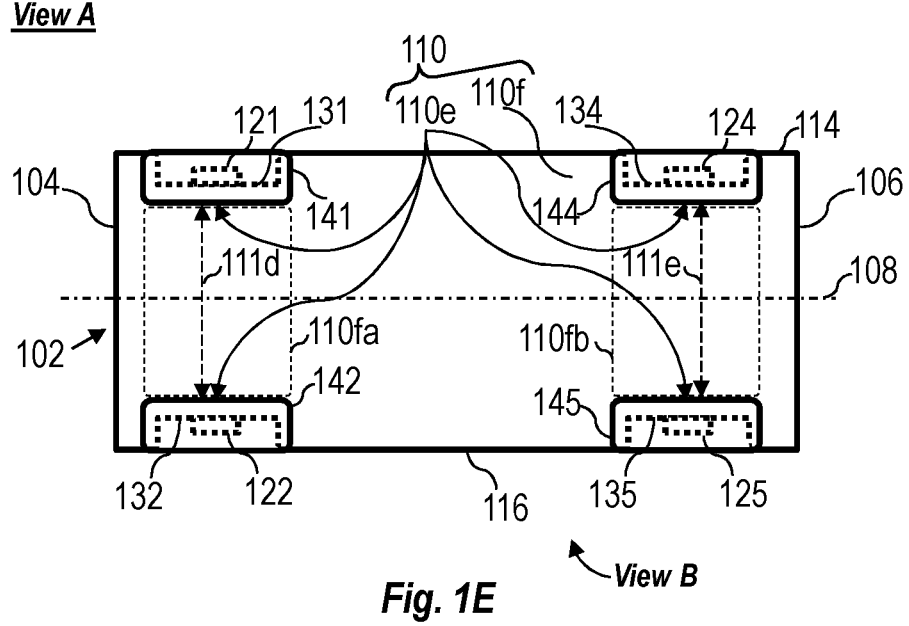
FIGS. 1E and 1F are schematic illustrations of a vehicle chassis platform including non-flat portions on an upper frame surface, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Reference is now made to FIGS. 1A, 1B, 1C and 1D, which are schematic illustrations of a vehicle chassis platform 100, according to some embodiments of the invention.

FIGS. 1A, 1B, 1C and 1D show schematic views A, B, C and D of vehicle chassis platform 100, respectively, as defined in FIGS. 1A and 1B.

Vehicle chassis platform 100 may include a frame 102. Frame 102 may have a front frame end 104, a rear frame end 106, a longitudinal frame axis 108, an upper frame surface 110, a bottom frame surface 112, a first longitudinal lateral frame surface 114 and a second longitudinal lateral frame surface 116.

Upper frame surface 110 may be flat, or substantially flat. In some embodiments, bottom frame surface 112 is flat. In some embodiments, upper frame surface 110 and bottom frame surface 112 are parallel (or substantially parallel) with each other.

Upper frame surface 110 may be, for example, a surface on which a vehicle cabin may be installed and bottom frame surface 112 may be a surface that is opposite (or substantially opposite) to upper frame surface 110. In some embodiments, frame 102 includes structural profiles that form the frame. In some embodiments, frame 102 has one or more gaps surrounded by the structural profiles. In some embodiments, frame 102 includes one or more upper plates coupled to a first side of the structural profiles to provide upper frame surface 110. In some embodiments, upper frame surface 110 is an imaginary surface covering the first side of the structural profiles. In some embodiments, frame 102 includes one or more bottom plates coupled to a second side of the structural profiles (e.g., that is opposite to the first side thereof) to provide bottom frame surface 112. In some embodiments, bottom frame surface 112 is an imaginary surface covering the second side of the structural profiles.

In some embodiments, a width 111a of upper frame surface 110 (e.g., a distance between first and second longitudinal lateral frame surfaces 114, 116) is between 60% and 100% of a length 109 of upper frame surface 110 (e.g., a distance between front and rear frame ends 104, 106). For example, if width 111a of upper frame surface 110 varies along longitudinal frame axis 108, the maximal and/or the minimal width of upper frame surface 110 may be between 60% and 100% of a length 109 of upper frame surface 110.

Vehicle chassis platform 100 may include two or more mechanical connectors. Each of the mechanical connectors may be on one of the longitudinal lateral frame surfaces. Each of the mechanical connectors may couple a vehicle corner module (VCM) to frame 102. A VCM may couple a vehicle wheel to frame 102. In some embodiments, VCM may provide the vehicle wheel with one or more of drivetrain capabilities, braking capabilities, steering capabilities and suspension capabilities. In some embodiments, VCM includes a drivetrain unit. In some embodiments, VCM includes a steering unit. In some embodiments, VCM includes a suspension unit. In some embodiments, VCM includes a brake unit. Each of the mechanical connectors may transfer mechanical loads between frame 102 and a VCM when the VCM is coupled to frame 102.

In some embodiments, each of the mechanical connectors detachably couples a VCM to frame 102. In some embodiments, each of the mechanical connectors couples a VCM to one of the longitudinal lateral frame surfaces such that none of at least one of a suspension unit, a drivetrain unit, a brake unit, and a steering unit of the VCM is positioned in an area beneath bottom frame surface 112 and between the opposing mechanical connectors (e.g., areas 112*i*, 112*j* schematically shown in FIGS. 1C and 1D) and/or in an area above upper frame surface 110 and between the opposing mechanical connectors (e.g., areas 110*i*, 110*j* schematically shown in FIGS. 1C and 1D).

In some embodiments, vehicle platform 100 includes a first front mechanical connector 121 and a second front mechanical connector 122 (e.g., as shown in FIGS. 1A, 1C and 1D). First front mechanical connector 121 and second front mechanical connector 122 may be on opposite longitudinal lateral frame surfaces with respect to each other. For example, first front mechanical connector 121 may be on first longitudinal lateral frame surface 114 and second front mechanical connector 122 may be on second longitudinal lateral frame surface 116 (e.g., as shown in FIGS. 1A, 1C and 1D). First front mechanical connector 121 and second front mechanical connector 122 may be positioned along a front transverse frame axis 123 that is perpendicular to longitudinal frame axis 108.

In some embodiments, vehicle platform 100 includes a first rear mechanical connector 124 and a second rear mechanical connector 125 (e.g., as shown in FIGS. 1A, 1C and 1D). First rear mechanical connector 124 and second rear mechanical connector 125 may be on opposite longitudinal lateral frame surfaces with respect to each other. For example, first rear mechanical connector 124 may be on first longitudinal lateral frame surface 114 and second rear mechanical connector 125 may be on second longitudinal lateral frame surface 116 (e.g., as shown in FIGS. 1A, 1C and 1D). First rear mechanical connector 124 and second rear mechanical connector 125 may be positioned along a rear transverse frame axis 126 that is perpendicular to longitudinal frame axis 108.

In some embodiments, frame 102 includes two or more VCM indents. In some embodiments, the VCM indents are rectangular (or substantially rectangular). The VCM indents may be part of the longitudinal lateral frame surfaces. In some embodiments, each of the mechanical connectors may be positioned within one of the VCM indents. Each of the VCM indent may accommodate a VCM when the VCM is coupled to frame 102 and/or at least a portion of a vehicle wheel when the vehicle wheel is coupled to the VCM.

In some embodiments, frame 102 includes a first front VCM indent 131 being part of first longitudinal lateral frame surface 114 and a second front VCM indent 132 being part of second longitudinal lateral frame surface 116 (e.g., as shown in FIGS. 1A, 1C and 1D). First front mechanical connector 121 may be positioned within first front VCM indent 131. Second front mechanical connector 122 may be positioned within second front VCM indent 132. First and second front VCM indents 131, 132 may be positioned along front transverse frame axis 123.

In some embodiments, frame 102 includes a first rear VCM indent 134 being part of first longitudinal lateral frame surface 114 and a second rear VCM indent 135 being part of second longitudinal lateral frame surface 116 (e.g., as shown in FIGS. 1A, 1C and 1D). First rear mechanical connector 124 may be positioned within first rear VCM indent 134. Second rear mechanical connector 125 may be positioned within second rear VCM indent 135. First and second rear VCM indents 134, 135 may be positioned along rear transverse frame axis 126.

In various embodiments, a width 111*b* of upper frame surface 110 in a front intermediate transverse region 110*a* between first and second front VCM indents 131, 132 and/or a width 111*c* of upper frame surface 110 in a rear intermediate transverse region 110*b* between first and second rear VCM indents 134, 135 is between 40% and 90% of width 111*a* of upper frame surface 110. For example, if width 111*b* of upper frame surface 110 in front intermediate region 110*a* varies along longitudinal frame axis 108, the maximal and/or the minimal width of upper frame surface 110 in front intermediate region 110*a* may be between 40% and 90% of the width (e.g., the maximal and/or the minimal width) of upper frame surface 110. In another example, if width 111*c* of upper frame surface 110 in rear intermediate region 110*b* varies along longitudinal frame axis 108, the maximal and/or the minimal width of upper frame surface 110 in rear intermediate region 110*b* may be between 40% and 90% of the width (e.g., the maximal and/or the minimal width) of upper frame surface 110 (e.g., between 50%-80%, 60%-70%, etc.).

In some embodiments, upper frame surface 110 in front intermediate transverse region 110*a* is flat (or substantially flat). In some embodiments, upper frame surface 110 in rear intermediate transverse region 110*b* between first and second rear VCM indents 134, 135 is flat (or substantially flat). In some embodiments, upper frame surface 110 in a first intermediate longitudinal transverse region 110*c* between first front VCM indent 131 and first rear VCM indent 134 is flat (or substantially flat). In some embodiments, upper frame surface 110 in a second intermediate longitudinal transverse region 110*d* between second front VCM indent 132 and second rear VCM indent 135 is flat (or substantially flat).

In some embodiments, vehicle chassis platform 100 includes two or more data exchange interfaces. Each of the data exchange interfaces may be on one of the longitudinal lateral frame surfaces. Each of the data exchange interfaces may be coupled adjacent to one of the mechanical connectors such that coupling of a VCM to the respective data exchange interface may be established when the VCM is being coupled to the respective mechanical connector. Each of the data exchange interfaces may transmit data between vehicle chassis platform 100 and a VCM when the VCM is coupled to frame 102.

In some embodiments, vehicle chassis platform 100 includes a first front data exchange interface 127*a* on first longitudinal lateral frame surface 114 and a second front exchange data interface 127*b* on second longitudinal lateral frame surface 116. In some embodiments, vehicle chassis platform 100 includes a first rear data exchange interface 127*c* on first longitudinal lateral frame surface 114 and a second rear data exchange interface 127*d* on second longitudinal lateral frame surface 116.

In some embodiments, vehicle chassis platform 100 includes two or more power interfaces. Each of the power interfaces may be on one of the longitudinal lateral frame surfaces. Each of the power interfaces may be coupled adjacent to one of the mechanical connectors such that coupling of a VCM to the respective power interface may be established when the VCM is being coupled to the respective mechanical connector. Each of the power interfaces may transmit power from vehicle chassis platform 100 to a VCM when the VCM is coupled to the frame 102.

In some embodiments, vehicle chassis platform 100 includes a first front power interface 128a on first longitudinal lateral frame surface 114 and a second front power interface 128b on second longitudinal lateral frame surface 116. In some embodiments, vehicle chassis platform 100 includes a first rear power interface 128c on first longitudinal lateral frame surface 114 and a second rear power interface 128d on second longitudinal lateral frame surface 116.

Figure 1F:
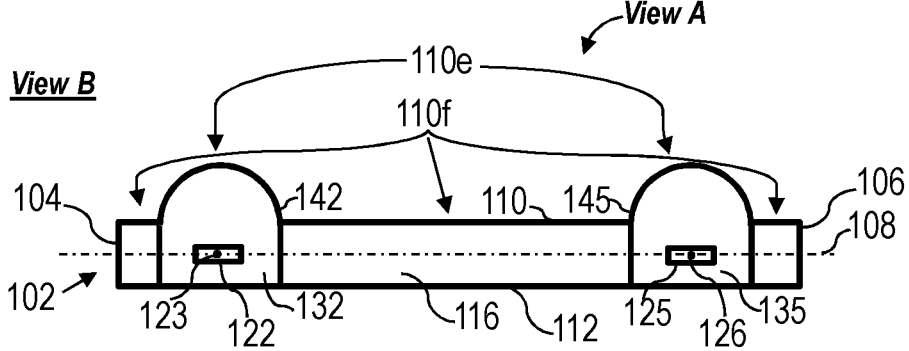

Reference is now made to FIGS. 1E and 1F, which are schematic illustrations of a vehicle chassis platform 100 including non-flat portions on an upper frame surface, according to some embodiments of the invention.

FIGS. 1E and 1F show schematic views A and B of vehicle chassis platform 100, respectively, as shown in FIGS. 1A and 1B.

In some embodiments, upper frame surface 110 includes one or more non-flat upper frame surface portions 110e and a flat upper frame surface portion 110f.

For example, non-flat upper frame surface portions 110e may be formed by fenders (e.g., as shown in FIGS. 1E and 1F). In some embodiments, frame 102 includes two or more fenders. Each of the fenders may be positioned on upper frame surface 110 adjacent to one of the VCM indents and may protrude from upper frame surface 110. Each of the fenders may frame, together with the respective VCM indent, a space adapted to accommodate a VCM when the VCM is coupled to frame 102.

In some embodiments, frame 102 includes a first front fender 141 that is adjacent to first front VCM indent 131 and a second front fender 142 that is adjacent to a second front VCM indent 132 (e.g., as shown in FIGS. 1E and 1F). In some embodiments, frame 102 includes a first rear fender 144 that is adjacent to first rear VCM indent 134 and a second rear fender 145 that is adjacent to second rear VCM indent 135 (e.g., as shown in FIGS. 1E and 1F). In some embodiments, fenders 141, 142, 144, 145 are components of the vehicle chassis platform 100 that support VCMs and hold and/or transfer some or all of the mechanical loads from the VCMs to the vehicle chassis platform 100. Fenders 141, 142, 144, 145 may connect at least one of a vehicle body, a vehicle capsule and a vehicle top hut to frame 102 of vehicle chassis platform 100.

In some embodiments, at least a portion of flat upper frame surface portion 110f extends between front frame end 104 and rear frame end 106. In some embodiments, at least a portion of flat upper frame surface portion 110f extends between first longitudinal lateral frame surface 114 and second longitudinal lateral frame surface 116.

In some embodiments, an area of flat upper frame surface portion 110f is between 80% and 95% of a total area of upper frame surface 110. In some embodiments, an area of non-flat upper frame surface portions 110e is between 5% and 40% of a total area of upper frame surface 110.

In some embodiments, a width of flat upper frame surface portion 110f in a region between non-flat upper frame surface portions disposed adjacent to opposite longitudinal lateral frame surfaces with respect to each other is between 40% and 80% of the width of upper frame surface 110. For example, a width 111d (e.g., maximal and/or minimal width) of upper frame surface portion 110f in an intermediate transverse region 110fa between first and second front fenders 141, 142 may be between 40% and 80% of the width (e.g., maximal and/or minimal width) of upper frame surface 110. In another example, a width 111e (e.g., maximal and/or minimal width) of upper frame surface portion 110f in an intermediate transverse region 110fb between first and second rear fenders 144, 145 may be between 40% and 80% of the width (e.g., maximal and/or minimal width) of upper frame surface 110 (e.g., between 70%-80%, 10%-30%, etc.).

Reference is now made to FIGS. 1G, 1H, 1I, 1J, 1K and 1L, which are schematic illustrations of a vehicle chassis platform 100 including one or more electrical-vehicle batteries (EVB) compartments, according to some embodiments of the invention.

In some embodiments, frame 102 includes one or more electrical-vehicle batteries (EVB) compartments. The EVB compartment(s) may be positioned within frame 102 between upper frame surface 110 and bottom frame surface 112.

Figure 1G:
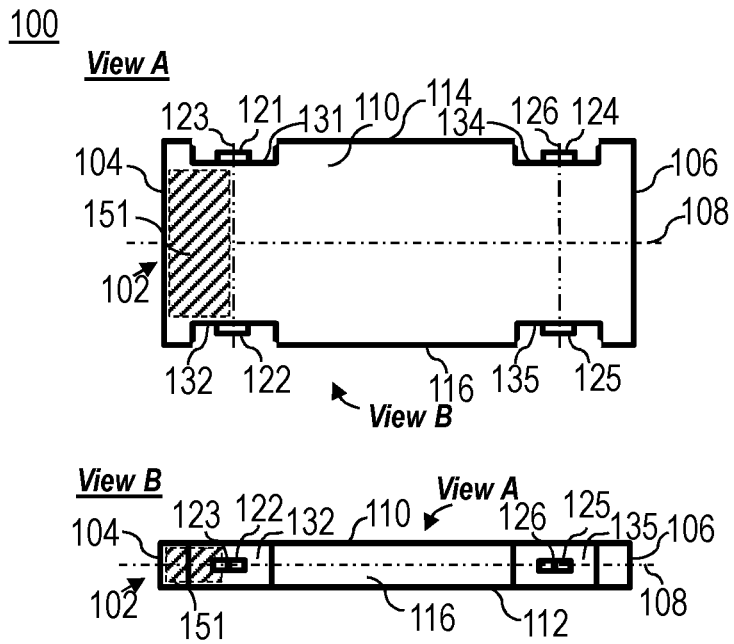
Figure 1H:
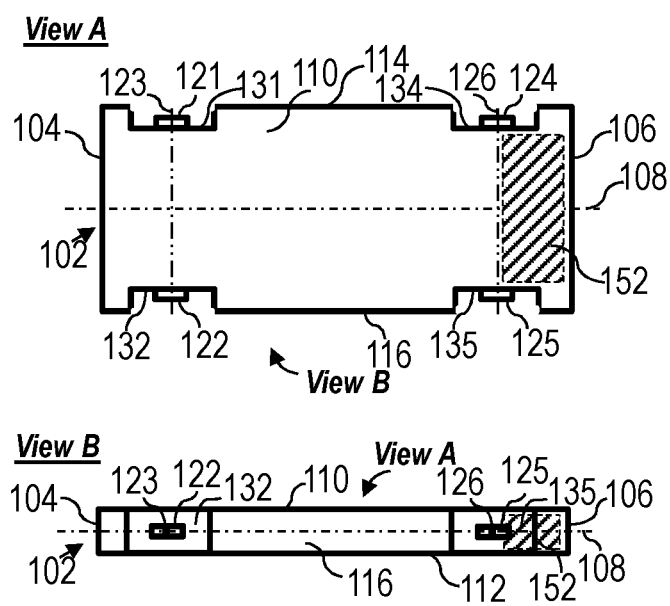

In some embodiments, frame 102 includes one or more first EVB compartments 151 positioned between front frame end 104 and front transverse frame axis 123 (e.g., as shown in FIG. 1G). In some embodiments, vehicle chassis platform 100 includes one or more second EVB compartments 152 positioned between rear frame end 106 and rear transverse frame axis 126 (e.g., as shown in FIG. 1H).

In some embodiments, frame 102 includes one or more third EVB compartments 153 positioned between first and second front mechanical connectors 121, 122 (e.g., as shown in FIG. 1I). For example, third EVB compartment(s) 153 may be adjacent to front frame end 104 and extend beyond front transverse frame axis 123 along longitudinal frame axis 108 (e.g., as shown in FIG. 1I). In another example, third EVB compartment(s) 153 may be positioned between first and second front VCM indents 131, 132.

In some embodiments, frame 102 includes one or more fourth EVB compartments 154 positioned between first and second rear mechanical connectors 124, 125 (e.g., as shown in FIG. 1J). For example, fourth EVB compartment(s) 154 may be adjacent to rear frame end 106 and extend beyond rear transverse frame axis 126 along longitudinal frame axis 108 (e.g., as shown in FIG. 1J). In another example, fourth EVB compartment(s) 154 may be positioned between first and second rear VCM indents 134, 135.

Figure 1K:
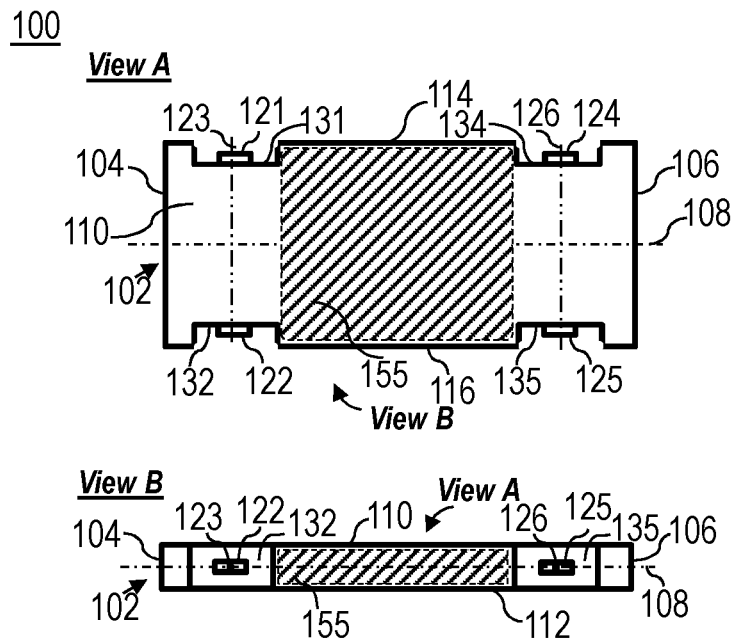

In some embodiments, frame 102 includes one or more fifth EVB compartments 155 positioned in a region between first and second transverse frame axes 123, 126 (e.g., as shown in FIG. 1K). For example, fifth compartment(s) 155 may be positioned in a region between front VCM indents 131, 132 and rear VCM indents 134, 135 (e.g., as shown in FIG. 1K).

Figure 1L:
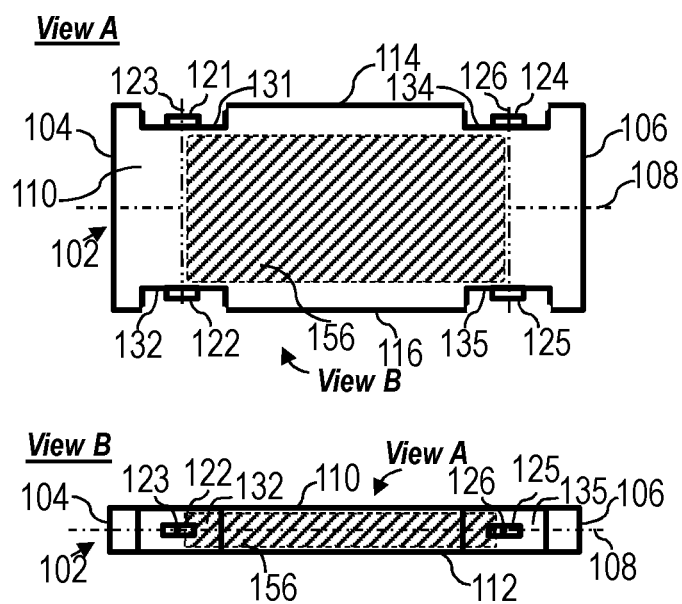

In some embodiments, frame 102 includes one or more sixth EVB compartments 156 extending between front transverse frame axis 123 and rear transverse frame axis 126 (e.g., as shown in FIG. 1L).

It is noted that other embodiments of EVM components are also possible. For example, frame 102 may include one or more EVB compartments extending from front frame end 104 to rear frame end 106. In another example, frame 102 may include one or more EVB compartments extending from front frame end 104 to rear transverse axis 126. In another example, frame 102 may include one or more EVB compartments extending from front transverse axis 123 to rear frame end 106.

In some embodiments, frame 102 includes any combination of the EVB compartments as shown and/or described.

Reference is now made to FIGS. 2A, 2B, 2C and 2D, which are schematic illustrations of a vehicle chassis platform 200 including two or more suspension units, according to some embodiments of the invention.

Vehicle chassis platform 200 may include a frame 202. Frame 202 may be similar to frame 102 described hereinabove. Frame 202 may have a front frame end 204, a rear frame end 206, a longitudinal frame axis 208, an upper frame surface 210, a bottom frame surface 212, a first longitudinal lateral frame surface 214 and a second longitudinal lateral frame surface 216. Upper frame surface 210 may be flat, or substantially flat. In some embodiments, bottom frame surface 212 is flat. In some embodiments, upper frame surface 210 and bottom frame surface 212 are parallel (or substantially parallel) to each other.

In some embodiments, vehicle chassis platform 200 may include two or more suspension units. In some embodiments, the suspension units are coupled to the longitudinal lateral frame surfaces. In some embodiments, the suspension units are coupled to frame 202 in cavities between upper frame surface 210 and bottom frame surface 212 (e.g., such as cavities 892, 894 described below with respect to FIGS. 8A, 8B and 8C). In some embodiments, each of the suspension units is coupled to frame 202 such that none of components of the suspension unit is positioned in an area beneath bottom frame surface 212 and between the longitudinal lateral frame surfaces 214, 216 and in an area above upper frame surface 210 and between the longitudinal lateral frame surfaces 214, 216.

In some embodiments, vehicle chassis platform 200 includes a first front suspension unit 261 coupled to first longitudinal lateral frame surface 214 and a second front suspension unit 262 coupled to second longitudinal lateral frame surface 216. In some embodiments, vehicle chassis platform 200 includes a first rear suspension unit 264 coupled to first longitudinal lateral frame surface 214 and a second rear suspension unit 265 coupled to second longitudinal lateral frame surface 216.

In some embodiments, frame 202 includes two or more indents being part of the longitudinal lateral frame surfaces. In some embodiments, each of the suspension units may be positioned within one of the indents.

Figure 2A:
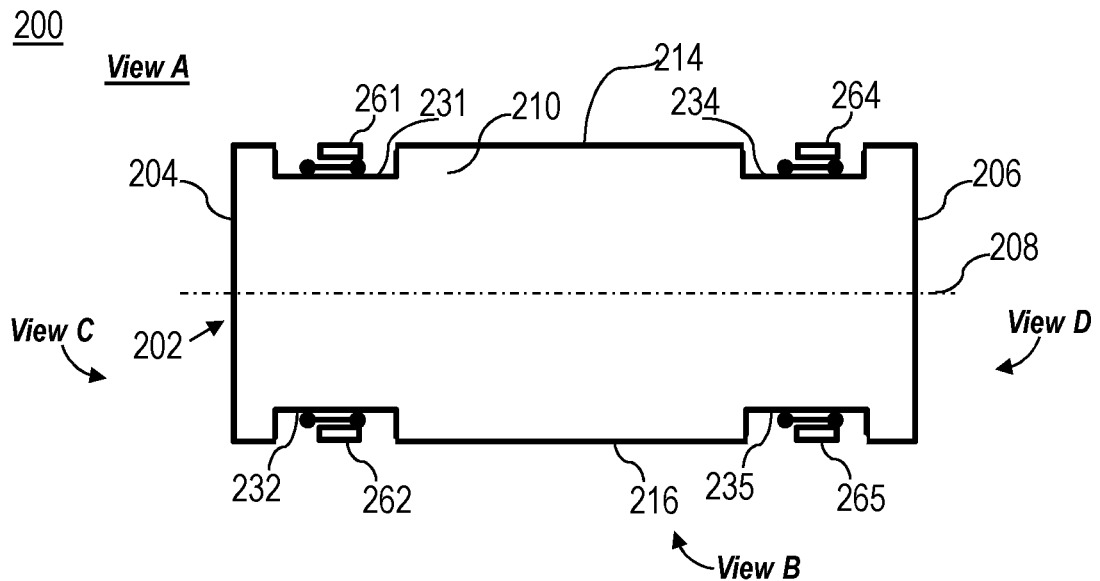
FIGS. 2A, 2B, 2C and 2D are schematic illustrations of a vehicle chassis platform including two or more suspension units, according to some embodiments of the invention.
Figure 2B:
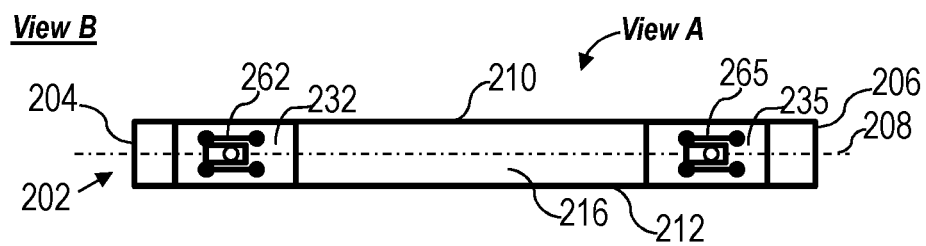
Figure 2C:
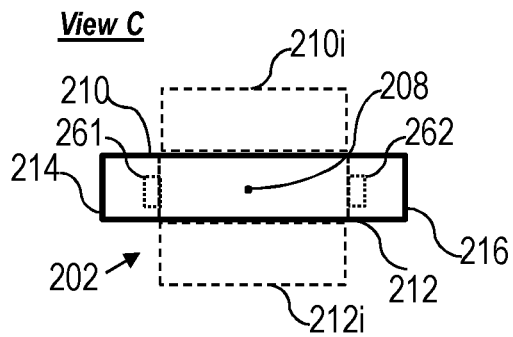

In some embodiments, frame 202 includes a first front indent 231 being part of first longitudinal lateral frame surface 214 and a second front indent 232 being part of second longitudinal lateral frame surface 216. First front suspension unit 261 may be positioned within first front indent 231. Second front suspension unit 262 may be positioned within second front indent 232. In some embodiments, none of components of first and second front suspension units 261, 262 is positioned in an area 212i below bottom frame surface 212 and between longitudinal lateral surfaces of first and second front indents 231, 232 (e.g., as shown in FIG. 2C) and in an area 210i above bottom frame surface 210 and between longitudinal lateral surfaces of first and second front indents 231, 232 (e.g., as shown in FIG. 2C).

Figure 2D:
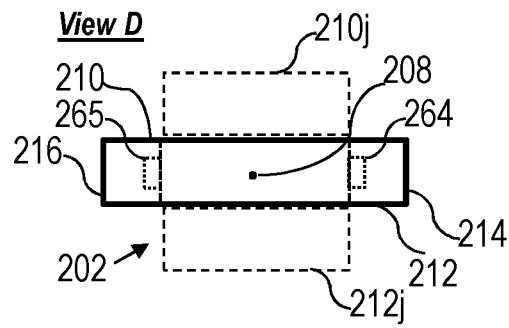

In some embodiments, frame 202 includes a first rear indent 234 being part of first longitudinal lateral frame surface 214 and a second rear indent 235 being part of second longitudinal lateral frame surface 216. First rear suspension unit 264 may be positioned within first rear indent 234. Second rear suspension unit 265 may be positioned within second rear indent 235. In some embodiments, none of components of first and second rear suspension units 264, 265 is positioned in an 212j area below bottom frame surface 212 and between longitudinal lateral surfaces of first and rear second indents 234, 234 (e.g., as shown in FIG. 2D) and in an area 210j above bottom frame surface 210 and between longitudinal lateral surfaces of first and second rear indents 234, 234 (e.g., as shown in FIG. 2D).

Figure 3A:
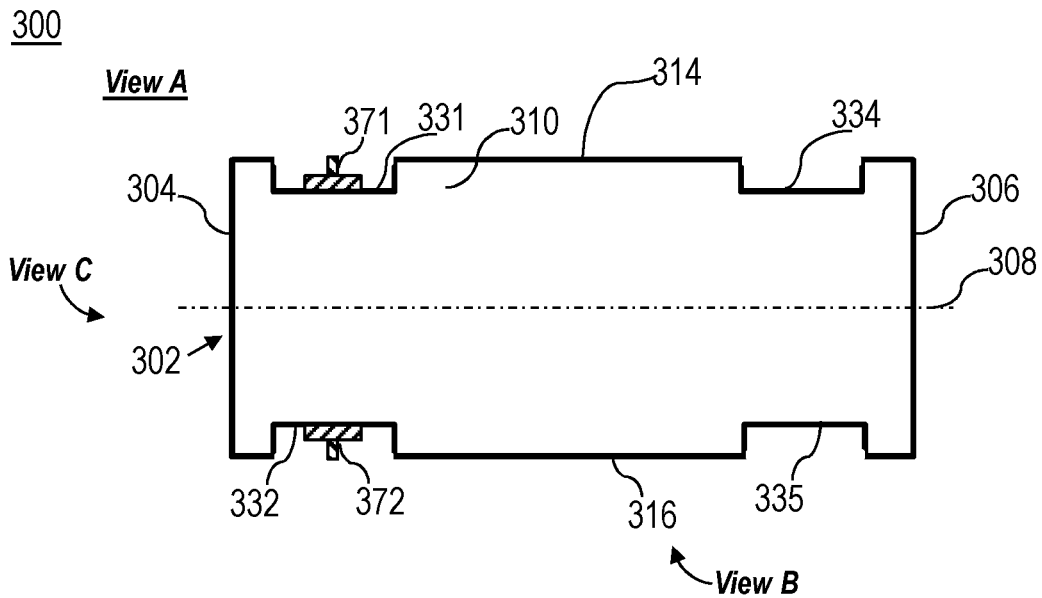
FIGS. 3A, 3B and 3C are schematic illustrations of a vehicle chassis platform including two or more drivetrain units, according to some embodiments of the invention.
Figure 3B:
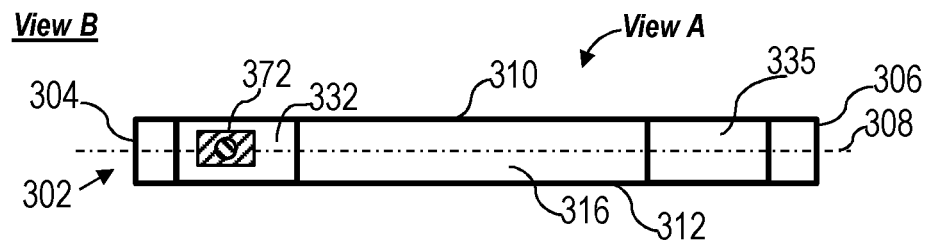
Figure 3C:
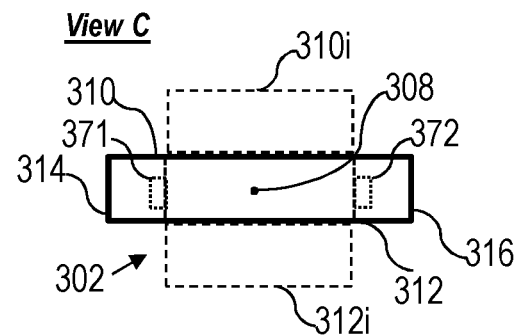

Reference is now made to FIGS. 3A, 3B and 3C, which are schematic illustrations of a vehicle chassis platform 300 including two or more drivetrain units, according to some embodiments of the invention.

Vehicle chassis platform 300 may include a frame 302. Frame 302 may be similar to frame 102 described hereinabove. Frame 302 may have a front frame end 304, a rear frame end 306, a longitudinal frame axis 308, an upper frame surface 310, a bottom frame surface 312, a first longitudinal lateral frame surface 314 and a second longitudinal lateral frame surface 316. Upper frame surface 310 may be flat, or substantially flat. In some embodiments, bottom frame surface 312 is flat. In some embodiments, upper frame surface 310 and bottom frame surface 312 are parallel (or substantially parallel) with respect to each other.

In some embodiments, vehicle chassis platform 300 includes two or more drivetrain units. In some embodiments, the drivetrain units are coupled to the longitudinal lateral frame surfaces. In some embodiments, the drivetrain units are coupled to frame 302 in cavities between upper frame surface 310 and bottom frame surface 312 (e.g., such as cavities 892, 894 described below with respect to FIGS. 8A, 8B and 8C). In some embodiments, each of the drivetrain units is coupled to frame 302 such that none of components of the drivetrain unit is positioned in an area beneath bottom frame surface 312 and between the longitudinal lateral frame surfaces 314, 316 and/or in an area above upper frame surface 310 and between the longitudinal lateral frame surfaces 314, 316.

In some embodiments, vehicle chassis platform 300 includes a first front drivetrain unit 371 coupled to first longitudinal lateral frame surface 314 and a second front drivetrain unit 372 coupled to second longitudinal lateral frame surface 316.

In some embodiments, frame 302 includes two or more indents being part of the longitudinal lateral frame surfaces. In some embodiments, each of the drivetrain units may be positioned within one of the indents. In some embodiments, frame 302 includes a first front indent 331 being part of first longitudinal lateral frame surface 314 and a second front indent 332 being part of second longitudinal lateral frame surface 316. First front drivetrain unit 371 may be positioned within first front indent 331. Second front drivetrain unit 372 may be positioned within second front indent 332. In some embodiments, none of components of first and second front drivetrain units 371, 372 is positioned in an area 312i below bottom frame surface 312 and between longitudinal lateral surfaces of first and second front indents 331, 332 (e.g., as shown in FIG. 3C) and in an area 310i above bottom frame surface 310 and between longitudinal lateral surfaces of first and second front indents 331, 332 (e.g., as shown in FIG. 3C).

In various embodiments, vehicle chassis platform 300 includes a first rear drivetrain unit coupled to first longitudinal lateral frame surface 314 and/or positioned in a first rear indent 334 and a second rear drivetrain unit coupled to second longitudinal lateral frame surface 316 and/or positioned in a second rear indent 335. In some embodiments, none of components of first and second rear drivetrain units is positioned in an area below bottom frame surface 312 and between longitudinal lateral surfaces of first and second rear indents 334, 335 and in an area above bottom frame surface 310 and between longitudinal lateral surfaces of first and second rear indents.

In some embodiments, vehicle chassis platform 300 includes the first and second front drivetrain units only. In some embodiments, vehicle chassis platform 300 includes the first and second rear drivetrain units only. In some embodiments, vehicle chassis platform 300 includes the first and second front drivetrain units and the first and second rear drivetrain units.

In some embodiments, the drivetrain units are not mechanically connected to each other.

Figure 4A:
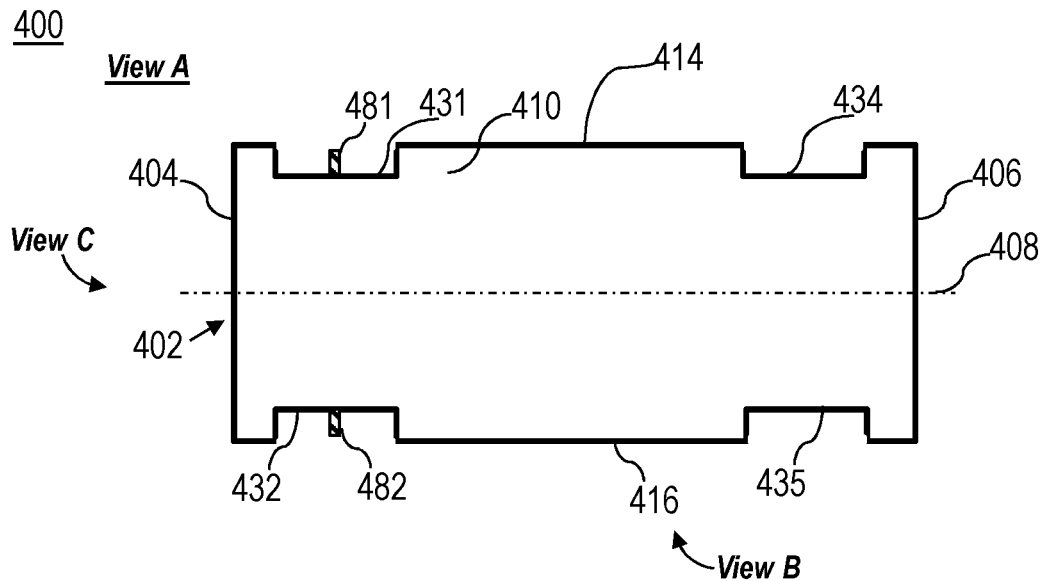
FIGS. 4A, 4B and 4C are schematic illustrations of a vehicle chassis platform including two or more steering units, according to some embodiments of the invention.
Figure 4B:
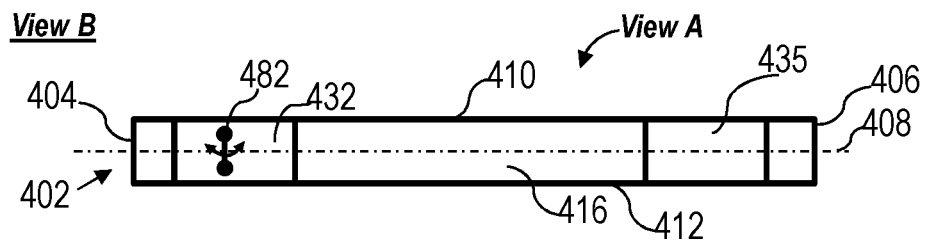
Figure 4C:
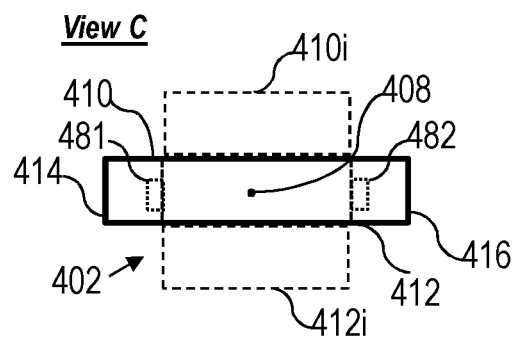

Reference is now made to FIGS. 4A, 4B and 4C, which are schematic illustrations of a vehicle chassis platform 400 including two or more steering units, according to some embodiments of the invention.

Vehicle chassis platform 400 may include a frame 402. Frame 402 may be similar to frame 102 described hereinabove. Frame 402 may have a front frame end 404, a rear frame end 406, a longitudinal frame axis 408, an upper frame surface 410, a bottom frame surface 412, a first longitudinal lateral frame surface 414 and a second longitudinal lateral frame surface 416. Upper frame surface 410 may be flat, or substantially flat. In some embodiments, bottom frame surface 412 is flat. In some embodiments, upper frame surface 410 and bottom frame surface 412 are parallel (or substantially parallel) with respect to each other.

In some embodiments, vehicle chassis platform 400 includes two or more steering units. In some embodiments, the steering units are coupled to the longitudinal lateral frame surfaces. In some embodiments, the steering units are coupled to frame 402 in cavities between upper frame surface 410 and bottom frame surface 412 (e.g., such as cavities 892, 894 described below with respect to FIGS. 8A, 8B and 8C). In some embodiments, each of the steering units is coupled to frame 402 such that none of components of the steering unit is positioned in an area beneath bottom frame surface 412 and between the longitudinal lateral frame surfaces 414, 416 and/or in an area above upper frame surface 410 and between the longitudinal lateral frame surfaces 414, 416.

In some embodiments, vehicle chassis platform 400 includes a first front steering unit 481 coupled to first longitudinal lateral frame surface 414 and a second front steering unit 482 coupled to second longitudinal lateral frame surface 416.

In some embodiments, frame 402 includes two or more indents on the longitudinal lateral frame surfaces. In some embodiments, each of the steering units may be positioned within one of the indents.

In some embodiments, frame 402 includes a first front indent 431 being part of first longitudinal lateral frame surface 414 and a second front indent 432 being part of second longitudinal lateral frame surface 416. First front steering unit 481 may be positioned within first front indent 431. Second front steering unit 482 may be positioned within second front indent 432. In some embodiments, none of components of first and second front steering units 481, 482 is positioned in an area 412i below bottom frame surface 412 and between longitudinal lateral surfaces of first and second front indents 431, 432 (e.g., as shown in FIG. 4C) and in an area 410i above bottom frame surface 410 and between longitudinal lateral surfaces of first and second front indents 431, 432 (e.g., as shown in FIG. 4C).

In various embodiments, vehicle chassis platform 400 includes a first rear steering unit coupled to first longitudinal lateral frame surface 414 and/or positioned in a first rear indent 434 and a second rear steering unit coupled to second longitudinal lateral frame surface 416 and/or positioned in a second rear indent 435. In some embodiments, none of components of first and second rear steering units is positioned in an area below bottom frame surface 412 and between longitudinal lateral surfaces of first and second rear indents 434, 435 and in an area above bottom frame surface 410 and between longitudinal lateral surfaces of first and second rear indents 434, 435.

In some embodiments, vehicle chassis platform 400 includes the first and second front steering units only. In some embodiments, vehicle chassis platform 400 includes the first and second rear steering units only. In some embodiments, vehicle chassis platform 500 includes the first and second front steering units and the first and second rear steering units.

In some embodiments, the steering units are not mechanically connected to each other.

Reference is now made to FIGS. 5A, 5B, 5C and 5D, which are schematic illustrations of a vehicle chassis platform 500 including two or more brake units, according to some embodiments of the invention.

Vehicle chassis platform 500 may include a frame 502. Frame 502 may be similar to frame 102 described hereinabove. Frame 502 may have a front frame end 504, a rear frame end 506, a longitudinal frame axis 508, an upper frame surface 510, a bottom frame surface 512, a first longitudinal lateral frame surface 514 and a second longitudinal lateral frame surface 516. Upper frame surface 510 may be flat, or substantially flat. In some embodiments, bottom frame surface 512 is flat. In some embodiments, upper frame surface 510 and bottom frame surface 512 are parallel (or substantially parallel) to each other.

In some embodiments, vehicle chassis platform 500 may include two or more brake units. In some embodiments, the brake units may be coupled to the longitudinal lateral frame surfaces. In some embodiments, the brake units are coupled to frame 502 in cavities between upper frame surface 510 and bottom frame surface 512 (e.g., such as cavities 892, 894 described below with respect to FIGS. 8A, 8B and 8C). In some embodiments, each of the brake units is coupled to frame 502 such that none of components of the brake unit is positioned in an area beneath bottom frame surface 512 and between the longitudinal lateral frame surfaces 514, 516 and in an area above upper frame surface 510 and between the longitudinal lateral frame surfaces 514, 516.

In some embodiments, vehicle chassis platform 500 includes a first front brake unit 591 coupled to first longitudinal lateral frame surface 514 and a second front brake unit 592 coupled to second longitudinal lateral frame surface 516. In some embodiments, vehicle chassis platform 500 includes a first rear brake unit 594 coupled to first longitudinal lateral frame surface 514 and a second rear brake unit 595 coupled to second longitudinal lateral frame surface 516.

In some embodiments, frame 502 includes two or more indents being part of the longitudinal lateral frame surfaces. In some embodiments, each of the brake units may be positioned within one of the indents.

Figure 5A:
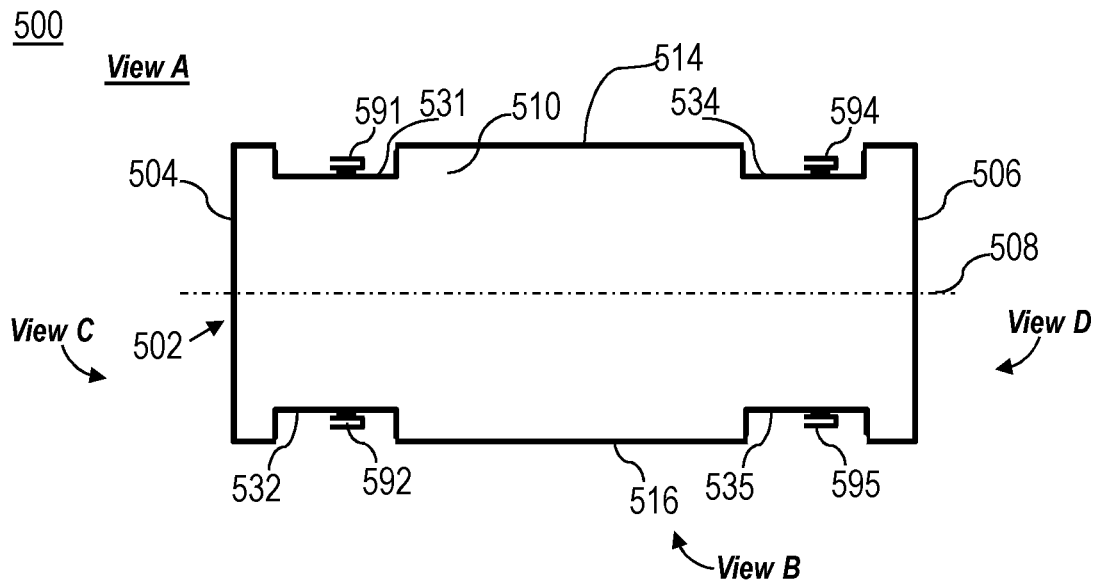
FIGS. 5A, 5B, 5C and 5D are schematic illustrations of a vehicle chassis platform including two or more brake units, according to some embodiments of the invention.
Figure 5B:
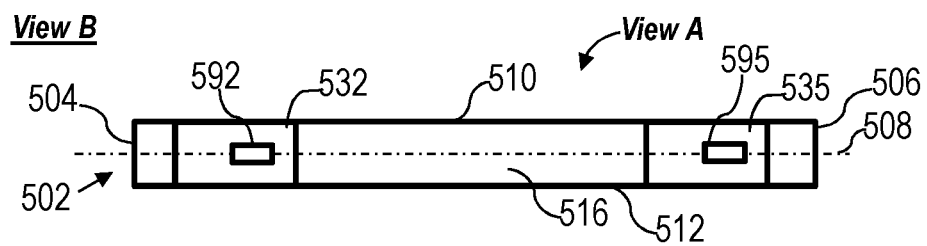
Figure 5C:
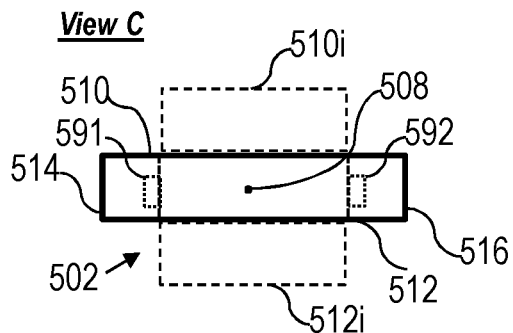

In some embodiments, frame 502 includes a first front indent 531 being part of first longitudinal lateral frame surface 514 and a second front indent 532 being part of second longitudinal lateral frame surface 516. First front brake unit 591 may be positioned within first front indent 531. Second front brake unit 592 may be positioned within second front indent 532. In some embodiments, none of components of first and second front brake units 591, 592 is positioned in an area 512i below bottom frame surface 512 and between longitudinal lateral surfaces of first and second front indents 531, 532 (e.g., as shown in FIG. 5C) and in an area 510i above bottom frame surface 510 and between longitudinal lateral surfaces of first and second front indents 531, 532 (e.g., as shown in FIG. 5C).

Figure 5D:
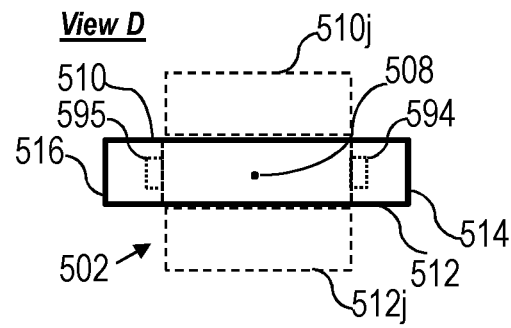

In some embodiments, frame 502 includes a first rear indent 534 being part of first longitudinal lateral frame surface 514 and a second rear indent 535 being part of second longitudinal lateral frame surface 516. First rear brake unit 594 may be positioned within first rear indent 534. Second rear brake unit 595 may be positioned within second rear indent 535. In some embodiments, none of components of first and second rear brake units 594, 595 is positioned in an 512*j* area below bottom frame surface 512 and between longitudinal lateral surfaces of first and rear second indents 534, 535 (e.g., as shown in FIG. 5D) and in an area 510*j* above bottom frame surface 510 and between longitudinal lateral surfaces of first and second rear indents 534, 535 (e.g., as shown in FIG. 5D).

Reference is now made to FIGS. 6A, 6B, 6C and 6D, which are schematic illustrations of one exemplary embodiment of a vehicle chassis platform 600, according to some embodiments of the invention.

FIGS. 6A, 6B, 6C and 6D show schematic panoramic view, schematic top view, schematic side view and schematic bottom view of vehicle chassis platform 600, respectively.

Vehicle chassis platform 600 may include a frame 602. Frame 602 may be similar to frame 102 described hereinabove. Frame 602 may have a front frame end 604, a rear frame end 606, a longitudinal frame axis 608, an upper frame surface 610, a bottom frame surface 612, a first longitudinal lateral frame surface 614 and a second longitudinal lateral frame surface 616.

Upper frame surface 610 may be flat, or substantially flat. In some embodiments, bottom frame surface 612 is flat. In some embodiments, upper frame surface 610 and bottom frame surface 612 are parallel (or substantially parallel) with each other.

Vehicle chassis platform 600 may include two or more mechanical connectors. The mechanical connectors may be similar to mechanical connectors described hereinabove with respect to FIGS. 1A-1D. Vehicle platform 600 may include a first front mechanical connector 621 coupled to first longitudinal lateral frame surface 614 and a second front mechanical connector 622 coupled to second longitudinal lateral frame surface 616. First front mechanical connector 621 and second front mechanical connector 622 may be positioned along a front transverse frame axis 623 that is perpendicular to longitudinal frame axis 608.

Figure 6A:
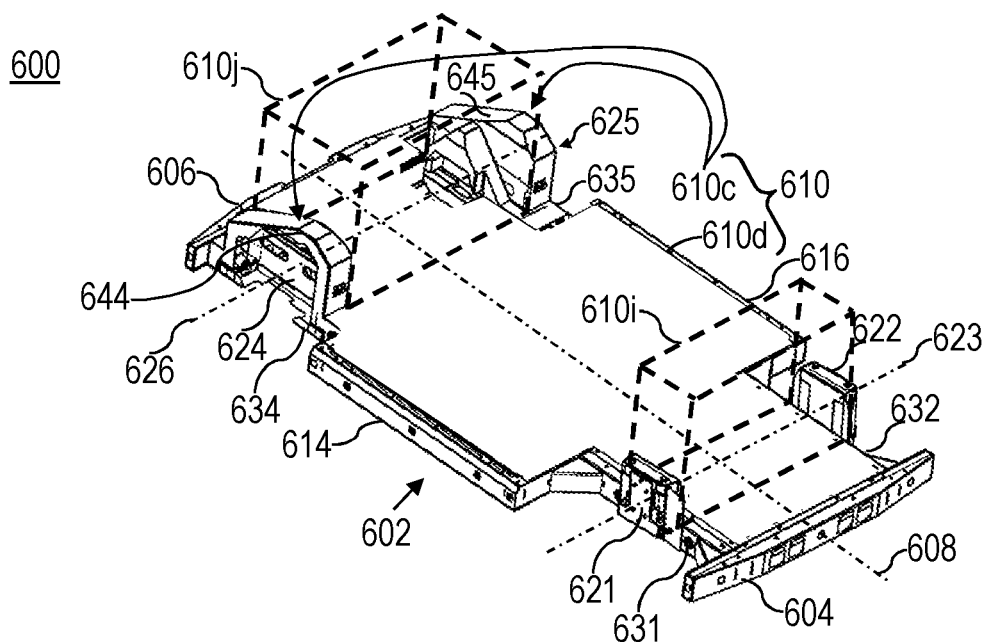
FIGS. 6A, 6B, 6C and 6D are schematic illustrations of one embodiment of a vehicle chassis platform, according to some embodiments of the invention.
Figure 6B:
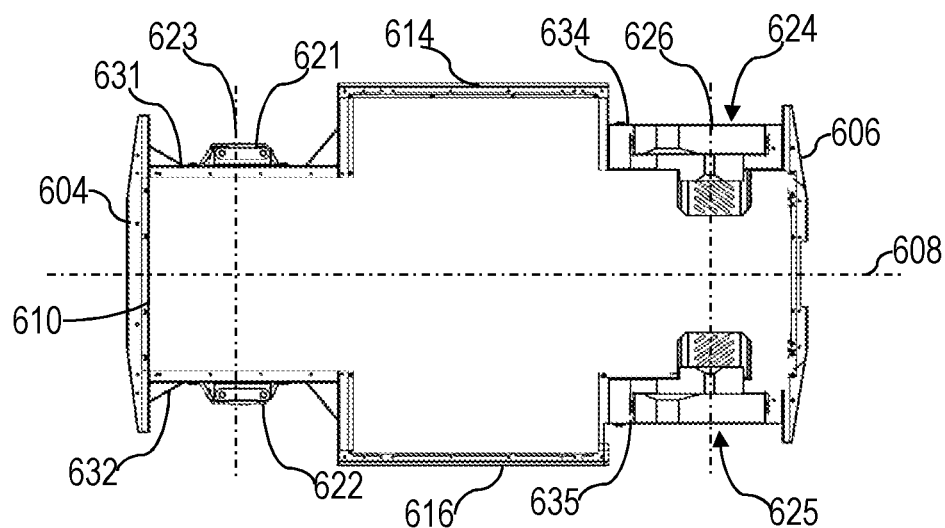
Figure 6C:
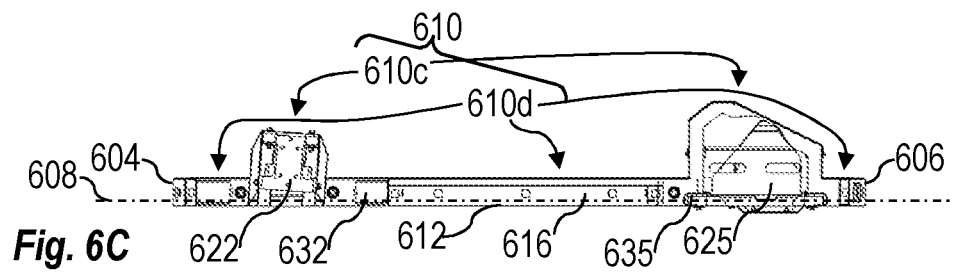
Figure 6D:
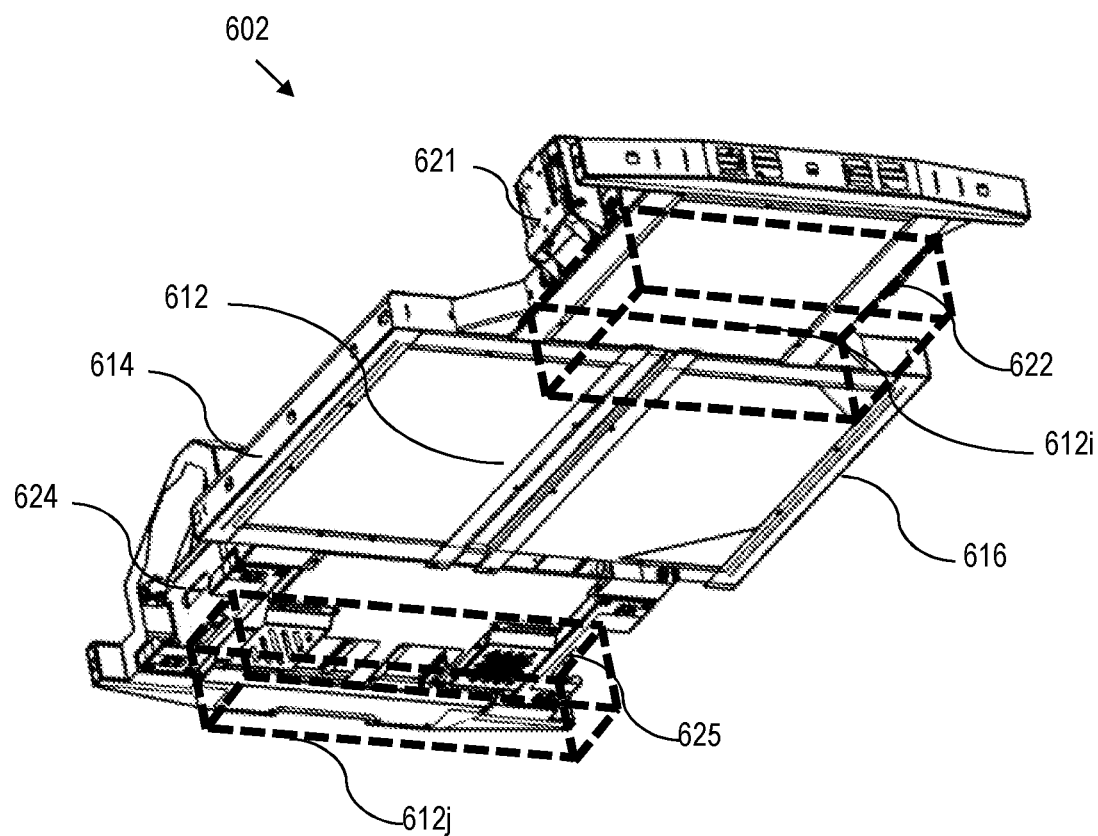
Figure 7A:
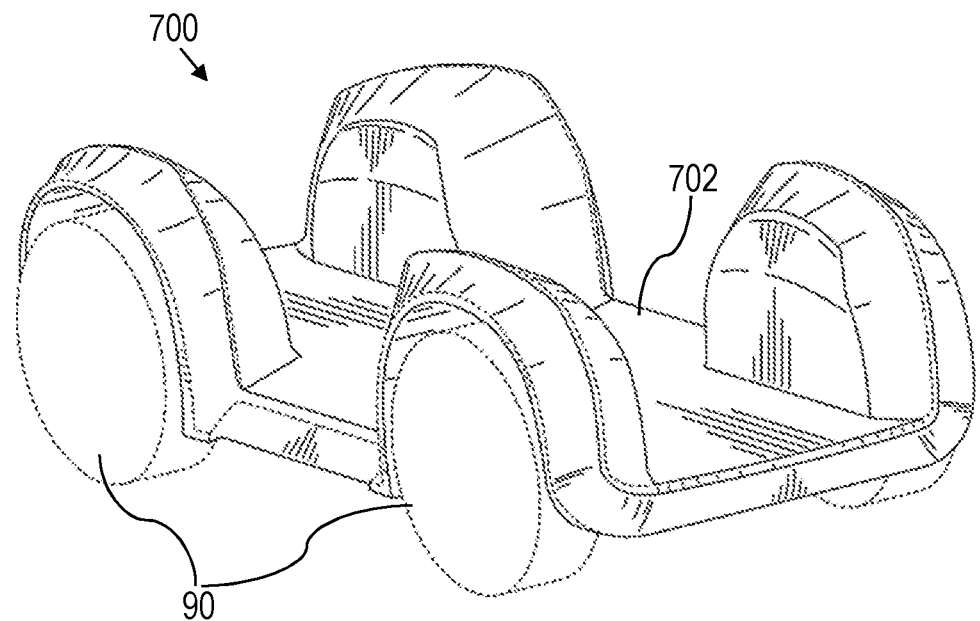
FIGS. 7A, 7B, 7C, 7D, 7E and 7F are schematic illustrations of one embodiment of a vehicle chassis platform and wheels assembled thereto, according to some embodiments of the invention.
Figure 7B:
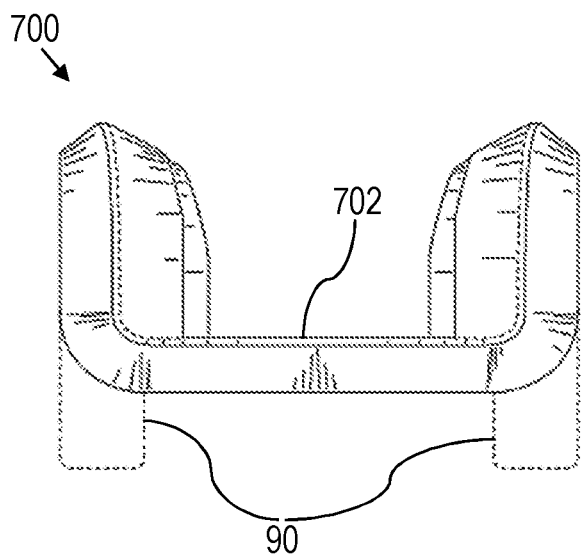
Figure 7C:
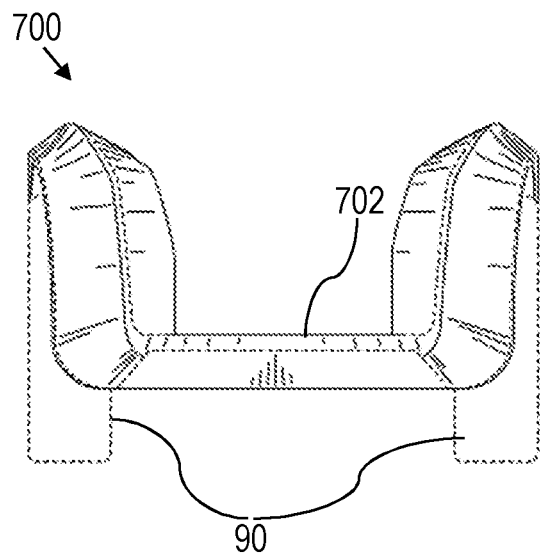
Figure 7D:
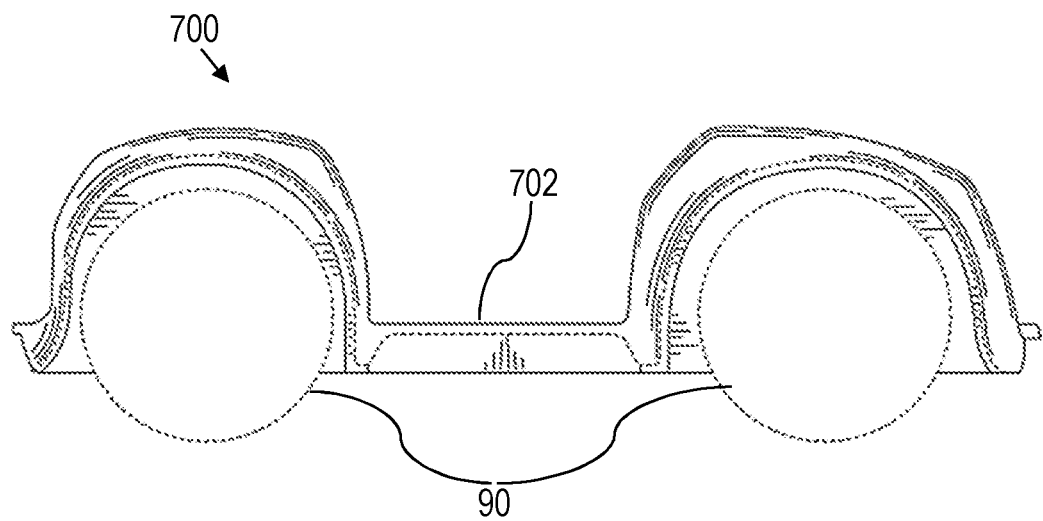
Figure 7E:
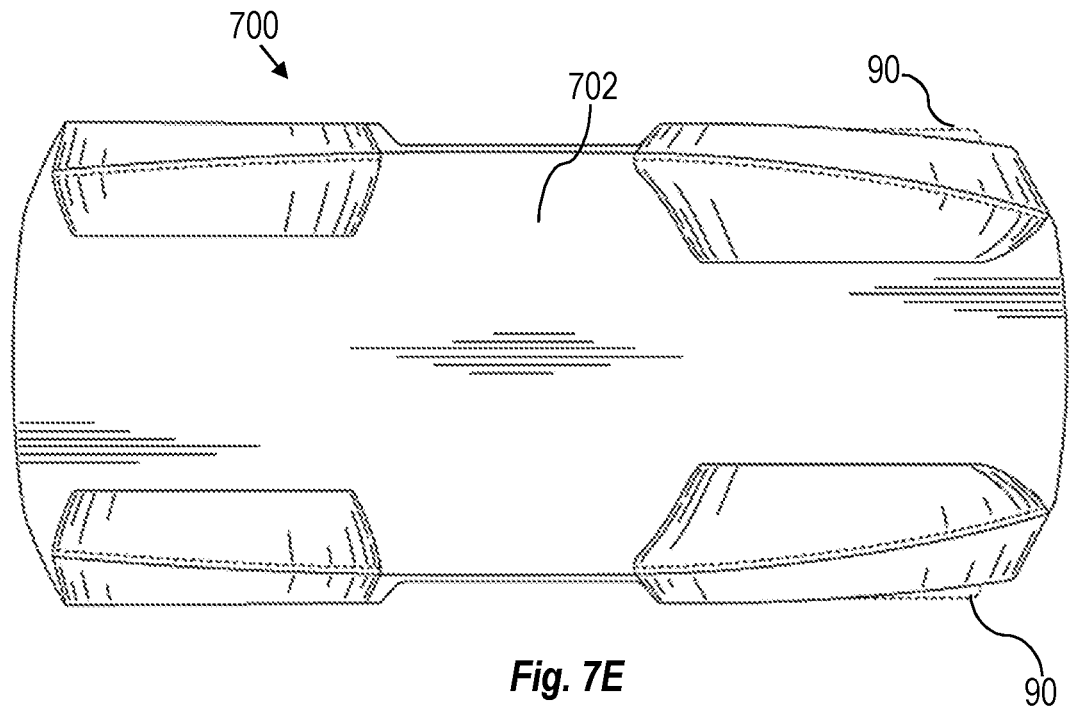
Figure 7F:
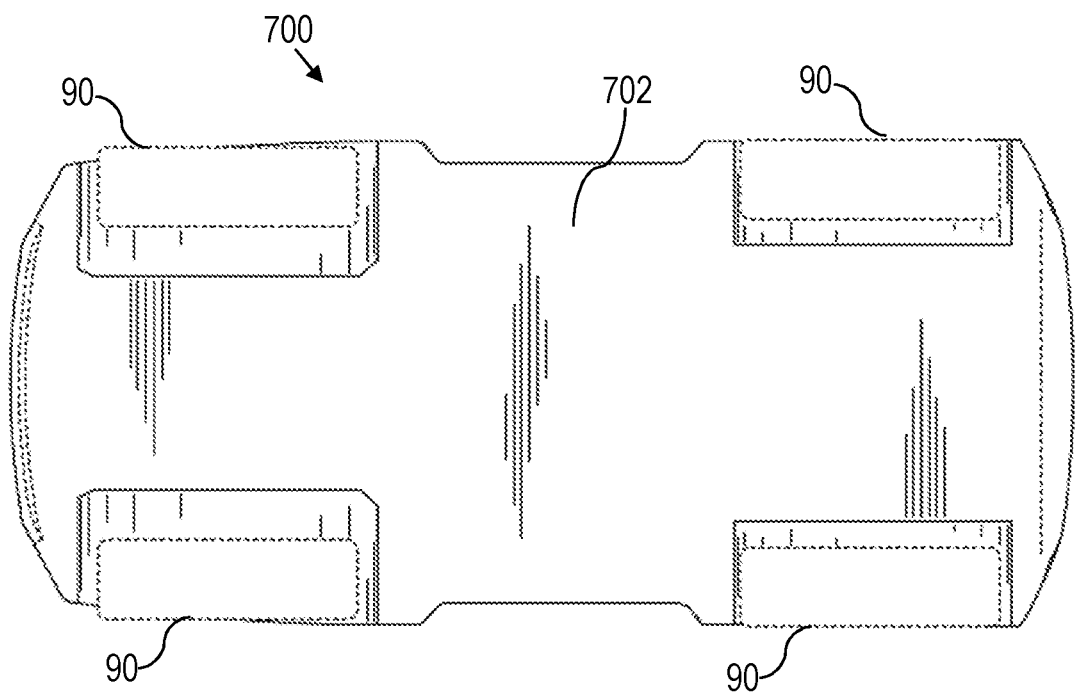

In some embodiments, each of front mechanical connectors 621, 622 couples a VCM to one of the longitudinal lateral frame surfaces 614, 616 such that none of components of the VCM is positioned in an area 612*i* beneath bottom frame surface 612 and between front mechanical connectors 621, 622 (e.g., as shown in FIG. 6D) and/or in an area 610*i* above upper frame surface 610 and between front mechanical connectors 621, 622 (e.g., as shown in FIG. 6C).

Vehicle platform 600 may include a first rear mechanical connector 624 coupled to first longitudinal lateral frame surface 614 and a second rear mechanical connector 625 coupled to second longitudinal lateral frame surface 616. First rear mechanical connector 624 and second rear mechanical connector 625 may be positioned along a rear transverse frame axis 626 that is perpendicular to longitudinal frame axis 608.

In some embodiments, each of rear mechanical connectors 624, 625 couples a VCM to one of the longitudinal lateral frame surfaces 614, 616 such that none of components of the VCM is positioned in an area 612*j* beneath bottom frame surface 612 and between rear mechanical connectors 624, 625 (e.g., as shown in FIG. 6D) and/or in an area 610*j* above upper frame surface 610 and between rear mechanical connectors 624, 625 (e.g., as shown in FIG. 6C).

Frame 602 may include a first front VCM indent 631 being part of first longitudinal lateral frame surface 614 and a second front VCM indent 632 being part of second longitudinal lateral frame surface 616. First front mechanical connector 621 may be positioned within first front VCM indent 631. Second front mechanical connector 622 may be positioned within second front VCM indent 632.

Frame 602 may include a first rear VCM indent 634 being part of first longitudinal lateral frame surface 614 and a second rear VCM indent 635 being part of second longitudinal lateral frame surface 616. First rear mechanical connector 624 may be positioned within first rear VCM indent 634. Second rear mechanical connector 625 may be positioned within second rear VCM indent 635.

Upper frame surface 610 may include non-flat upper frame surface portions 610*c* (e.g., formed by a first rear fender 644 that is adjacent to first rear VCM indent 634 and a second rear fender 645 that is adjacent to second rear VCM indent 635) and a flat upper frame surface portion 610*d*. At least a portion of flat upper frame surface portion 610*d* extends between front frame end 604 and rear frame end 606. At least a portion of flat upper frame surface portion 610*d* extends between first longitudinal lateral frame surface 614 and second longitudinal lateral frame surface 616.

For example, a length of frame 602 (e.g., a distance from front frame end 604 to rear frame end 606) may be between 2.5-6 meters, a width of frame 602 (e.g., a distance between first and second longitudinal lateral frame surfaces 614, 616) may be between 1.4-2 meters, a length of the VCM indents (e.g., a dimension of the VCM indents along longitudinal frame axis 608) may be between 0.5-0.9 meters and a width of the VCM indents (e.g., a dimension of the VCM indents along front and/or transverse frame axes 623, 626) may be between 0.2-0.6 meters.

In various embodiments, vehicle chassis platform 600 may include data exchange interface and/or power interfaces (e.g., similar to data exchange interface and/or power interfaces described hereinabove with respect to FIGS. 1A-1D).

In some embodiments, vehicle chassis platform 600 includes at least one of a front bumper and a rear bumper. The front bumper may be attachable to front frame end 604 and the rear bumper may be attachable to rear fame end 606. The front bumper and/or the rear bumper may have bumper height values that are greater than a thickness of frame 602 (e.g., the bumper height values may be greater than a distance between upper frame surface 610 and bottom frame surface 612). The front and/or the rear bumpers may, for example, extend above or below the flat upper frame surface 610 and/or bottom frame surface 612.

Reference is now made to FIGS. 7A, 7B, 7C, 7D, 7E and 7F, which are schematic illustrations of an embodiment of a vehicle chassis platform 700 and wheels 90 assembled thereto, according to some embodiments of the invention.

FIGS. 7A, 7B, 7C, 7D, 7E and 7F schematically show different views of vehicle chassis platform 700 including a frame 702 and of wheels 90 assembled to frame 702.

Reference is now made to FIG. 8A, which is a schematic illustration of an embodiment of a vehicle chassis platform 800, according to some embodiments of the invention. Reference is also made to FIGS. 8B and 8C, which are schematic illustration of a front portion and a rear portion, respectively, of vehicle chassis platform 800, according to some embodiments of the invention.

Vehicle chassis platform 800 may include a frame 802. Frame 802 may be similar to frame 102 described hereinabove. Frame 802 may have a front frame end 804, a rear frame end 806, an upper frame surface 810, a bottom frame surface 812, a first longitudinal lateral frame surface 814 and a second longitudinal lateral frame surface 816.

Vehicle chassis platform 800 may include mechanical connectors (e.g., such as mechanical connectors 121, 122, 124, 125 described hereinabove). Each of the mechanical connectors may be on one of first and second longitudinal lateral frame surfaces 814, 816. In some embodiments, each of the mechanical connectors includes one or more holes. These holes may be used to connect a VCM to the mechanical connector using screws, bolt, etc.

For example, FIGS. 8A, 8B show a front mechanical connector 822 and FIGS. 8A, 8C show a rear mechanical connector 825 on second lateral frame surfaces 816. As shown in FIGS. 8A, 8B and 8C, each of front and rear mechanical connectors 822, 825 includes one or more holes on second lateral frame surfaces 816.

In some embodiments, frame 802 may include one or more cavities between upper frame surface 810 and bottom frame surface 812. Each of the one or more cavities may receive one or more components of a VCM when the VCM is connected to frame 802 using the respective mechanical connection. For example, FIGS. 8A, 8B and FIGS. 8A, 8C show a first cavity 892 and a second cavity 894, respectively, between upper frame surface 810 and bottom frame surface 812.

Figure 9A:
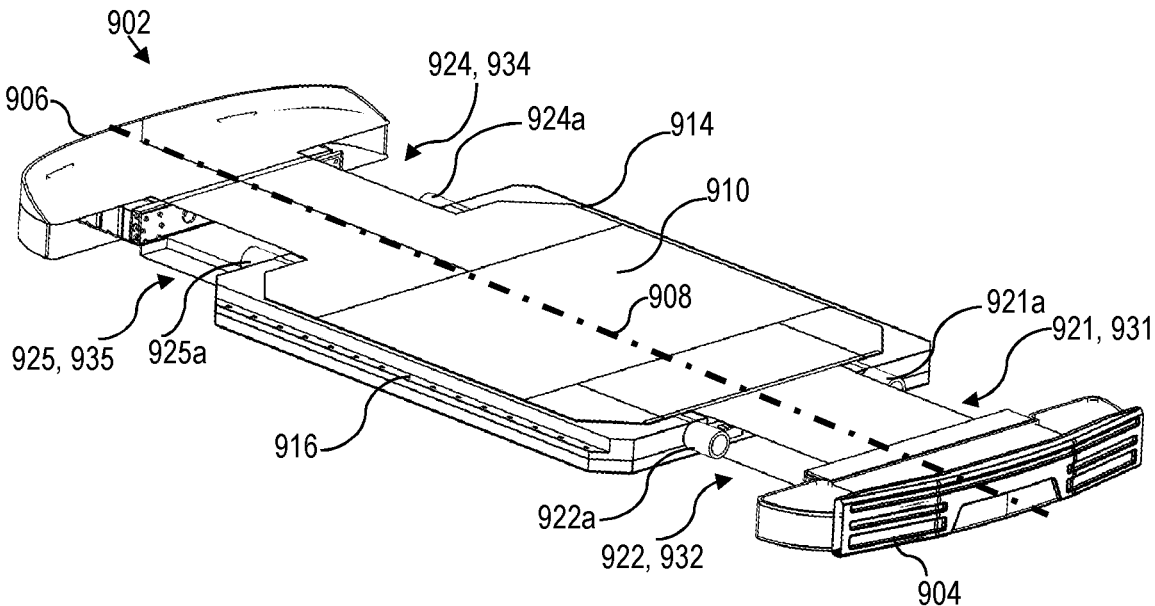
FIG. 9A is a schematic illustration of a vehicle chassis platform, according to some embodiments of the invention.
Figure 9B:
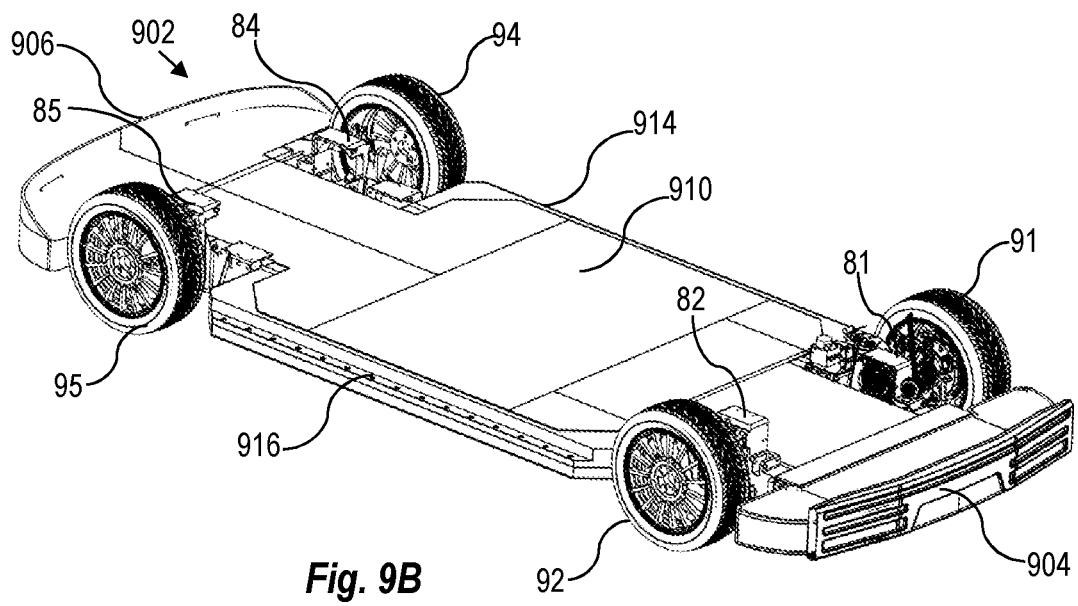
FIGS. 9B, 9C and 9D are schematic illustrations of a vehicle chassis platform, vehicle corner modules (VCMs) assembled to vehicle chassis platform and wheels assembled to VCMs, according to some embodiments of the invention.
Figure 9C:
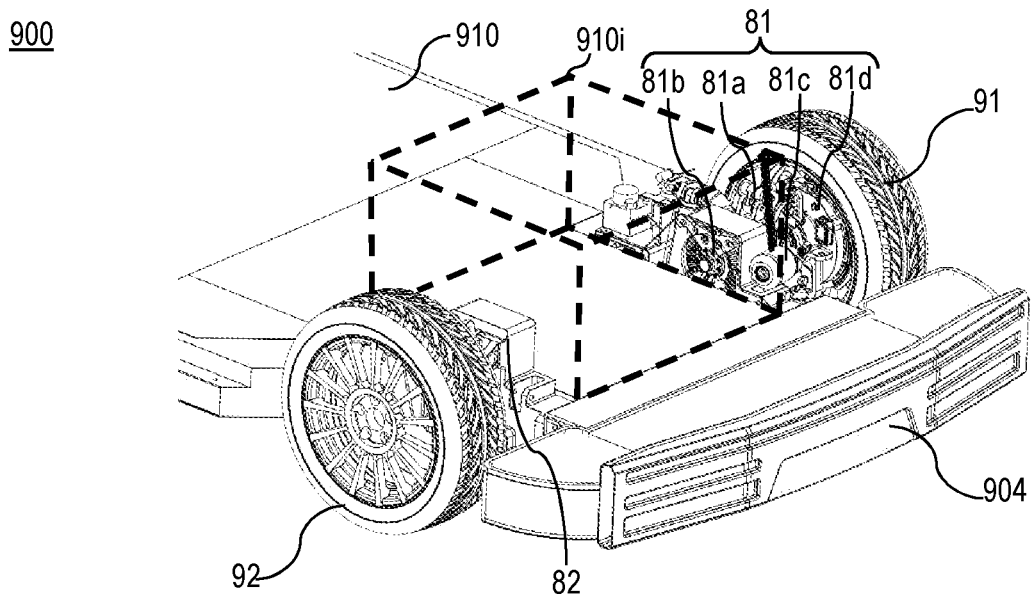
Figure 9D:
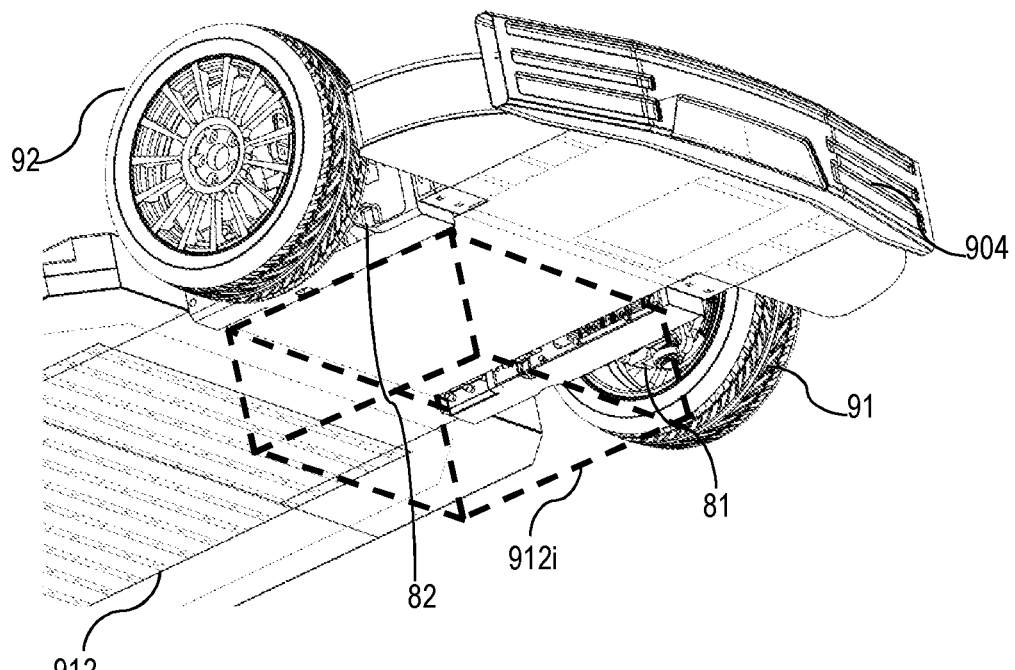

Reference is now made to FIG. 9A, which is a schematic illustration of a vehicle chassis platform 900, according to some embodiments of the invention. Reference is also made to FIGS. 9B, 9C and 9D, which are schematic illustrations of vehicle chassis platform 900, vehicle corner modules (VCMs) assembled to vehicle chassis platform 900 and wheels assembled to VCMs, according to some embodiments of the invention.

Vehicle chassis platform 900 may include a frame 902. Frame 902 may be similar to frame 102 described hereinabove. Frame 902 may have a front frame end 904, a rear frame end 906, a central longitudinal frame axis 908, an upper frame surface 910, a bottom frame surface 912, a first longitudinal lateral frame surface 914 and a second longitudinal lateral frame surface 916.

Vehicle chassis platform 900 may include a first front mechanical connector 921 on first longitudinal lateral frame surface 914 and a second front mechanical connector 922 on second longitudinal lateral frame surface 916. Vehicle chassis platform 900 may include a first rear mechanical connector 924 on first longitudinal lateral frame surface 914 and a second rear mechanical connector 925 on second longitudinal lateral frame surface 916.

Frame 902 may include a first front VCM indent 931 on first longitudinal lateral frame surface 914 and a second front VCM indent 932 on second longitudinal lateral frame surface 916. First front VCM indent 931 may include first front mechanical connector 921 and second front VCM indent 932 may include second front mechanical connector 922. Frame 902 may include a first rear VCM indent 934 on first longitudinal lateral frame surface 914 and a second rear VCM indent 935 on second front mechanical connector 922. First rear VCM indent 934 may include first rear mechanical connector 924 and second rear VCM indent 935 may include second rear mechanical connector 925.

In some embodiments, each of the mechanical connectors includes a connection bar that is parallel (or substantially parallel) to central longitudinal frame axis 908. For example, first front mechanical connector 921 may include a first front connection bar 921a, second front mechanical connector 922 may include a second front connection bar 922a, first rear mechanical connector 924 may include a first rear connection bar 924a, second front mechanical connector 925 may include a second rear connection bar 925a (e.g., as shown in FIG. 9A).

In some embodiments, each of the connection bars extends along at least a portion of the respective VCM indent in a direction that is parallel (or substantially parallel) to central longitudinal frame axis 908 (e.g., as shown in FIG. 9A). The connection bars may have a circular, an oval, a rectangular or any other shape of cross-section. The connection bars enhance and/or support the connection of the VCMs to frame 902.

First and second front mechanical connectors 921, 922 may couple a first and second front vehicle corner modules (VCMs) 81, 82, respectively, to frame 902, and first and second rear mechanical connectors 924, 925 may couple a first and second rear vehicle corner modules (VCMs) 84, 88, respectively, to frame 902. First and second front VCMs 81, 82 may couple a first and second front wheels 91, 92, respectively, to frame 902, and first and second rear VCMs 84, 85 may couple a first and second rear wheels 94, 95, respectively, to frame 902.

Each of mechanical connectors 921, 922, 924, 925 may couple its respective VCM 81, 82, 84, 85 to one of the longitudinal lateral frame surfaces such that none of at least one of a suspension unit, a drivetrain unit, a brake unit, and a steering unit of the respective VCM is positioned in an area beneath bottom frame surface 912 and between the opposing mechanical connectors and/or in an area above upper frame surface 910 and between the opposing mechanical connectors (e.g., as described hereinabove).

For example, FIGS. 9B and 9C show that none of components of suspension unit 81a, drivetrain unit 81b, steering unit 81c and brake unit 81d of first VCM 81 is positioned in an area 912i beneath bottom frame surface 912 and between opposing first and second front mechanical connectors 921, 922 and in an area 910i above upper frame surface 910 and between opposing first and second front mechanical connectors 921, 922.

Some embodiments of the present invention may provide a vehicle. The vehicle may include a vehicle chassis platform. The vehicle chassis platform may be any one of vehicle chassis platform 100, vehicle chassis platform 200, vehicle chassis platform 300, vehicle chassis platform 400, vehicle chassis platform 500, vehicle chassis platform 600, vehicle chassis platform 700, vehicle chassis platform 800 and vehicle chassis platform 900 as described hereinabove.

In some embodiments, the vehicle includes one or more electrical-vehicle batteries (EVB) being accommodated within the vehicle chassis platform. In some embodiments, the EVB are accommodated within one or more EVB compartments within a frame (e.g., as described elsewhere herein).

The vehicle may be for example, a private vehicle, a passenger car, a commercial vehicle, an autonomous vehicle, a human driven vehicle, a remotely controlled vehicle, a 4-wheeled car, a truck, a bus, a trailer, etc.

The disclosed vehicle chassis platform has a substantially flat upper frame surface and mechanical connectors on longitudinal lateral frame surfaces. Absence of structural components beneath a bottom frame surface and above the upper frame surface and/or substantially flat upper frame surface may save between 50% to 70% of space on the vehicle chassis platform as compared to current vehicle chassis platforms. This space may be used to, for example, increase a size of a vehicle cabin thus increasing the flexibility in designing the vehicle cabin.

The disclosed vehicle chassis platform may, for example, increase a flexibility in selection of electrical-vehicle batteries (EVB) as compared to current vehicle chassis platforms. For example, the frame of the vehicle chassis platform may include EVB compartments that may be positioned at various positions within the frame (e.g., as described hereinabove), thus providing a flexibility in selection of EVB type, EVB size, EVB shape. This in contrast to current vehicle chassis platforms that typically have limited space for accommodating the EVB batteries. Such flexibility may, for example, increase a performance of the vehicle having the disclosed vehicle chassis platform. Such flexibility may, for example, eliminate (or substantially eliminate) geometrical limitations present in current vehicle chassis platforms caused by limited areas in which EVB packs may be placed.

Furthermore, manufacturing of the substantially flat frame of the disclosed vehicle chassis platform may be significantly less complex as compared to current vehicle chassis platforms. For example, the frame of the disclosed vehicle chassis platform may include relatively simple structural profiles and a greater portion of the vehicle platform chassis may include substantially flat components having relatively simple geometry as compared to current vehicle chassis platforms.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A vehicle chassis platform, comprising:
   a frame having a front frame end, a rear frame end, a longitudinal frame axis, an upper frame surface, a bottom frame surface, and opposing lateral frame surfaces disposed on opposing sides of the longitudinal axis, wherein the upper frame surface is substantially flat; and
   at least one of: a pair of opposing drivetrain units, a pair of opposing steering units, and a pair of opposing braking units, coupled to the opposing lateral frame surfaces;
   wherein none of the components of the at least one of: the pair of opposing drivetrain units, the pair of opposing steering units, and the pair of opposing braking units is positioned in at least one of:
      (i) an area beneath the bottom frame surface and between the opposing lateral frame surfaces, and
      (ii) an area above the upper frame surface and between the opposing lateral frame surfaces; and
   wherein the substantially flat upper frame surface extends between the at least one of: the pair of opposing drivetrain units, the pair of opposing steering units, and the pair of opposing braking units.

2. The vehicle chassis platform of claim 1, comprising the pair of the opposing steering units coupled to the opposing lateral frame surfaces, wherein none of the components of the opposing steering units is positioned in at least one of:
   (i) an area beneath the bottom frame surface and between the opposing lateral frame surfaces, and
   (ii) an area above the upper frame surface and between the opposing lateral frame surfaces.

3. The vehicle chassis platform of claim 1, comprising the pair of opposing braking units coupled to the opposing lateral frame surfaces, wherein none of the components of the opposing braking units is positioned in at least one of:
   (i) an area beneath the bottom frame surface and between the opposing lateral frame surfaces, and
   (ii) an area above the upper frame surface and between the opposing lateral frame surfaces.

4. The vehicle chassis platform of claim 1, comprising the pair of opposing drivetrain units coupled to the opposing lateral frame surfaces, wherein none of the components of the opposing drivetrain units is positioned in at least one of:
   (i) an area beneath the bottom frame surface and between the opposing lateral frame surfaces, and
   (ii) an area above the upper frame surface and between the opposing lateral frame surfaces.

5. The vehicle chassis platform of claim 1, comprising:
   two pairs of opposing drivetrain units, two pairs of opposing braking units, and two pairs of opposing steering units,
   wherein the opposing drivetrain units of each pair of the two pairs of opposing drivetrain units, the opposing braking units of each pair of the two pairs of opposing braking units and the opposing steering units of each pair of the two pairs of opposing steering units are coupled to the opposing lateral frame surfaces, and
   wherein none of the components of the two pairs of opposing drivetrain units, the two pairs of opposing braking units, and the two pairs of opposing steering units is positioned in at least one of:
      (i) an area beneath the bottom frame surface and between the opposing lateral surfaces, and
      (ii) an area above the upper frame surface and between the opposing lateral.

6. The vehicle chassis platform of claim 1, comprising:
a pair of vehicle corner modules (VCMs),
wherein each VCM of the pair of VCMs comprises at least one of: a drivetrain unit of the pair of opposing drivetrain units, a braking unit of the pair of opposing braking units, and a steering unit of the pair of opposing steering units, and
wherein the at least one of: the drivetrain unit, the braking units, and the steering unit of each VCM of the pair of VCMs is coupled to respective lateral frame surface of the opposing lateral frame surfaces via the respective VCM.

7. The vehicle chassis platform of claim 6, wherein each VCM of the pair of VCMs comprises the drivetrain unit of the pair of opposing drivetrain units, the braking unit of the pair of opposing braking units, and the steering unit of the pair of opposing steering units.

8. The vehicle chassis platform of claim 5, comprising:
two pairs of vehicle corner modules (VCMs),
wherein each VCM of each pair of VCMs of the two pairs of VCMs comprises at least one of: a drivetrain unit of a pair of opposing drivetrain units of the two pairs of opposing drivetrain units, a braking unit of a pair of opposing braking units of the two pairs opposing braking units, and a steering unit of a pair of opposing steering units of the two pairs opposing steering units, and
wherein the at least one of: the drivetrain unit, the braking units, and the steering unit of each VCM of each pair of VCMs of the two pairs of VCMs is coupled to respective lateral frame surface of the opposing lateral frame surfaces via the respective VCM.

9. The vehicle chassis platform of claim 8, wherein each VCM of each pair of VCMs of the two pairs of VCMs comprises the drivetrain unit of the pair of opposing drivetrain units of the two pairs of opposing drivetrain units, the braking unit of the pair of opposing braking units of the two pairs of opposing braking units, and the steering unit the pair of opposing steering units of the two pairs of opposing steering units.

10. The vehicle chassis platform of claim 1, wherein a minimal width of the upper frame surface is between 60% and 100% of a length of the upper frame surface.

11. The vehicle chassis platform of claim 1, wherein the upper frame surface comprises at least one non-flat upper frame surface portion and a flat upper frame surface portion, and wherein an area of the flat upper frame surface portion is between 80% and 95% of a total area of the upper frame surface.

12. The vehicle chassis platform of claim 1, wherein:
the upper frame surface comprises two non-flat upper frame surface portions disposed adjacent to the opposite longitudinal lateral frame surfaces with respect to each other and along a transverse frame axis that is perpendicular to the longitudinal frame axis, and
a width of the flat upper frame surface in an intermediate region between the two non-flat upper frame surface portions is between 40% and 90% of a maximal width of the upper frame surface.

13. The vehicle chassis platform of claim 1, wherein the flat upper frame surface portion extends between at least one of: the front frame end and the rear frame end; and the opposing lateral frame surface.

14. The vehicle chassis platform of claim 1, further comprising one or more electrical-vehicle batteries (EVB) compartments.

15. The vehicle chassis platform of claim 14, wherein at least a portion of at least one of the one or more EVB compartments is positioned between the upper frame surface and the bottom frame surface and between the at least one of: the pair of opposing drivetrain units, the pair of opposing steering units, and the pair of opposing braking units.

16. The vehicle chassis platform of claim 14,
wherein the at least one of: the pair of opposing drivetrain units, the pair of opposing steering units, and the pair of opposing braking units is coupled to the opposing lateral frame surfaces along a transverse axis that is perpendicular to the longitudinal frame axis, and
wherein at least a portion of at least one of the one or more EVB compartments is positioned between the transverse axis and the front frame end or the rear end of the frame.

17. The vehicle chassis platform of claim 1, wherein the frame comprises at least one of:
a pair of opposing front frame indents on the opposing lateral frame surface, and
a pair of opposing rear frame indents on the opposing lateral frame surface;
wherein the at least one of: the pair of opposing drivetrain units, the pair of opposing steering units, and the pair of opposing braking units coupled in the pair of opposing front frame indents or in the pair of opposing rear frame indents.

18. The vehicle chassis platform of claim 17, wherein a minimal width of the upper frame surface in a region between at least one of the pair of opposing front frame indents and the rear frame indents is between 40% and 90% of a maximal width of the upper frame surface.

19. The vehicle chassis platform of claim 1, wherein the bottom frame surface is substantially flat and substantially parallel to the upper frame surface in at least 70% of the area of the bottom frame surface.

20. The vehicle chassis platform of claim 11, wherein the at least one non-flat upper frame surface portion comprises a fender.

21. A vehicle comprising the vehicle chassis platform of claim 1.